US010419488B2

(12) United States Patent
Adam et al.

(10) Patent No.: US 10,419,488 B2
(45) Date of Patent: Sep. 17, 2019

(54) DELEGATING SECURITY POLICY MANAGEMENT AUTHORITY TO MANAGED ACCOUNTS

(71) Applicant: Microsoft Technology Licensing, LLC, Redmond, WA (US)

(72) Inventors: Preston Derek Adam, Woodinville, WA (US); Violet Anna Barhudarian, Kirkland, WA (US); Narendra S. Acharya, Kirkland, WA (US); Richard June, Seattle, WA (US); Shayak Lahiri, Redmond, WA (US); Qiongzhi Wu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 56 days.

(21) Appl. No.: 15/449,847

(22) Filed: Mar. 3, 2017

(65) Prior Publication Data
US 2018/0255101 A1    Sep. 6, 2018

(51) Int. Cl.
*G06F 17/00*    (2019.01)
*H04L 29/06*    (2006.01)
(Continued)

(52) U.S. Cl.
CPC .......... *H04L 63/20* (2013.01); *G06F 21/6218* (2013.01); *H04L 9/3247* (2013.01); *H04L 63/10* (2013.01); *G06F 2221/2141* (2013.01)

(58) Field of Classification Search
CPC ....... H04L 63/10; H04L 63/20; H04L 9/3247; G06F 21/6218; G06F 2221/2141
(Continued)

(56) References Cited

U.S. PATENT DOCUMENTS 7,565,416 B1    7/2009    Shafer et al.
7,779,247 B2    8/2010    Roegner
(Continued)

FOREIGN PATENT DOCUMENTS

WO    2014153366 A1    9/2014

OTHER PUBLICATIONS

"International Search Report & Written Opinion Issued in PCT Application No. PCT/US2018/019799", dated May 16, 2018, 13 Pages.
(Continued)

*Primary Examiner* — Gary S Gracia
(74) *Attorney, Agent, or Firm* — Newport IP, LLC; Mike R. Cicero

(57) ABSTRACT

A system may delegate authority to manage aspects of a security policy developed by administrative personnel to standard users (e.g. non-administrative personnel) corresponding to managed accounts within an administrative hierarchy. An exemplary security policy may include application management settings that allow or deny individual applications with access to various enterprise resources. The system may expose one or more user interfaces to standard users of an enterprise network to enable these standard users to modify the security policy being deployed for their managed account and/or to at least temporarily exempt a particular application from the enterprise's security policy. For example, upon a standard user attempting to access enterprise data with a particular application that is not permitted such access, the system may enable this standard user to change the security policy as applied to her device or to simply exempt the particular application from the security policy.

19 Claims, 9 Drawing Sheets

(51) Int. Cl.
*H04L 9/32* (2006.01)
*G06F 21/62* (2013.01)

(58) Field of Classification Search
USPC ............... 709/226; 726/1, 2, 7; 713/176
See application file for complete search history.

(56) References Cited

U.S. PATENT DOCUMENTS

| | | | |
|---|---|---|---|
| 8,042,150 B2 | 10/2011 | Haswarey et al. | |
| 8,078,713 B1 | 12/2011 | Kim | |
| 8,245,191 B2 | 8/2012 | Hirose et al. | |
| 8,290,841 B2 | 10/2012 | Beigi et al. | |
| 8,613,070 B1* | 12/2013 | Borzycki | G06F 21/6218 726/8 |
| 8,650,303 B1* | 2/2014 | Lang | G06F 21/51 709/226 |
| 8,799,994 B2 | 8/2014 | Barton et al. | |
| 8,819,820 B2 | 8/2014 | Milman et al. | |
| 9,369,466 B2 | 6/2016 | Ryerson et al. | |
| 9,418,236 B2 | 8/2016 | Cabrera et al. | |
| 9,420,002 B1* | 8/2016 | McGovern | H04L 63/10 |
| 9,430,664 B2 | 8/2016 | Adam et al. | |
| 9,495,538 B2 | 11/2016 | Schneider et al. | |
| 2001/0007133 A1 | 7/2001 | Moriconi et al. | |
| 2004/0205342 A1 | 10/2004 | Roegner | |
| 2007/0239859 A1 | 10/2007 | Wilkinson et al. | |
| 2008/0016104 A1 | 1/2008 | Kuehr-mclaren et al. | |
| 2008/0027860 A1* | 1/2008 | Mullen | G06Q 20/04 705/39 |
| 2008/0072049 A1* | 3/2008 | Cross | G06F 21/51 713/176 |
| 2008/0162581 A1* | 7/2008 | Long | G06F 16/273 |
| 2009/0265754 A1* | 10/2009 | Hinds | G06F 21/6218 726/1 |
| 2010/0205291 A1 | 8/2010 | Baldry et al. | |
| 2010/0274599 A1 | 10/2010 | Deroller | |
| 2012/0054841 A1 | 3/2012 | Schultz et al. | |
| 2012/0185916 A1* | 7/2012 | Chae | G06F 21/316 726/2 |
| 2013/0014212 A1 | 1/2013 | Cohen | |
| 2013/0239192 A1* | 9/2013 | Linga | G06F 21/44 726/7 |
| 2013/0268642 A1 | 10/2013 | Holland | |
| 2014/0196104 A1 | 7/2014 | Chari et al. | |
| 2014/0344570 A1 | 11/2014 | Adam et al. | |
| 2015/0271296 A1 | 9/2015 | Borzycki et al. | |
| 2015/0281281 A1 | 10/2015 | Peterson et al. | |
| 2016/0080149 A1 | 3/2016 | Mehta et al. | |
| 2016/0088016 A1* | 3/2016 | Emerson | H04L 63/20 726/1 |
| 2016/0127327 A1 | 5/2016 | Mehta et al. | |

OTHER PUBLICATIONS

"Determine Allow/Deny List and Application Inventory for Software Restriction Policies", https://technet.microsoft.com/en-us/library/hh994586(v=ws.11).aspx, Published on: Jun. 24, 2013, 2 pages.

Mathers, et al., "Self-service application access and delegated management with Azure Active Directory", https://docs.microsoft.com/en-us/azure/active-directory/active-directory-self-service-application-access, Published on: Sep. 2, 2016, 7 pages.

Vilcinskas, et al., "Conditional access in Azure Active Directory", https://docs.microsoft.com/en-us/azure/active-directory/active-directory-conditional-access, Published on: Dec. 16, 2016, 5 pages.

"Windows Selective Wipe for Device Data Management", https://technet.microsoft.com/en-us/library/dn486874.aspx, Published on: Nov. 1, 2013, 6 pages.

"Introducing FireMon Policy Planner", https://www.firemon.com/products/policy-planner/, Published on: Nov. 14, 2014, 4 pages.

Hu, et al., "Assessment of Access Control Systems", In Interagency Report 7316, Sep. 2006, 60 pages.

"Non Final Office Action Issued in U.S. Appl. No. 15/449,870", dated Nov. 1, 2018, 15 Pages.

"Final Office Action Issued in U.S. Appl. No. 15/449,870", dated Feb. 27, 2019, 16 Pages.

* cited by examiner

DELEGATING SECURITY POLICY MANAGEMENT AUTHORITY TO MANAGED ACCOUNTS

BACKGROUND

Enterprise network administrators are challenged with servicing large numbers of requests from standard users of enterprise network resources. One important goal of a network administrator is to tailor an enterprise security policy to individual client needs and/or preferences while still maintaining a policy that is strict enough to prevent unauthorized disclosures of enterprise data. Achieving this goal may require security policies to be customized to the needs of individual working teams or even individual employees while still accounting for highly complex computing environments having both personal and enterprise applications requiring access to thousands of personal and enterprise data resources. Exacerbating this challenge is the increased rate at which employees are electing to use personal devices to perform some or all of their enterprise tasks. This phenomenon blurs the distinction between personal applications which typically should be denied access to enterprise data resources and enterprise applications which typically should be granted access to enterprise data resources. Upon an enterprise security policy blocking a standard user from performing some action, the standard user may submit a change ticket request for the network administrator to review and then, ultimately, implement or deny. However, network administrators may have difficulties handling large numbers of such requests in a timely manner. Furthermore, having to handle redundant requests may detract from the network administrators' ability to effectively manage their other work responsibilities.

It is with respect to these considerations and others that the disclosure made herein is presented.

SUMMARY

Techniques described herein provide for delegation of a limited authority to develop and manage a security policy for an enterprise network to managed accounts of that enterprise network. Generally described, technologies disclosed herein enable a system to override and/or customize application management settings within an enterprise's security policy and, ultimately, to allow a standard user of a managed account to enable an application to access enterprise resources despite that application not being expressly permitted to do so by the enterprise's security policy.

As used herein, a "security policy" refers generally to defined permissions and/or restrictions associated with controlling the flow of enterprise data between various types of computing resources. An exemplary security policy may include application management settings that provision and control access of individual functional resources (e.g. computing devices and/or applications), or groups of functional resources, to individual data resources (e.g. enterprise network storage locations and/or enterprise data) or even other functional resources. As a specific example, the security policy may include mobile application management (MAM) settings that include a list of applications which are allowed to access enterprise resources and/or a list of applications which are forbidden from accessing enterprise resources. Such an exemplary security policy may further include MAM settings that define whether a particular application is permitted to communicate with (e.g. disclose data to and/or receive data from) other individual applications or groups of applications. In some implementations, a security policy may further include a default rule to deny access to applications that are not expressly listed as allowed to communicate with or forbidden from communicating with enterprise resources.

Conventional techniques for developing and/or managing an enterprise's security policy restrict application management settings from being modified except through administrative accounts that correspond to a limited number of enterprise employees having specific authorization to make such modifications, i.e. administrative personnel. According to such conventional techniques, in order for a standard user of a managed account to implement a change to her application management settings, the user must submit a change request ticket to administrative personnel to request that changes be made through an administrative account. Channeling change request tickets from many users of managed accounts to a relatively small group of administrative personnel having administrative account privileges can create workflow bottlenecks that hamper enterprise productivity. For example, the administrative personnel may become bogged down with high numbers of change request tickets such that a backlog of change request tickets may result in a lead-time between a change request ticket being submitted and corresponding changes to the user's application management settings being implemented.

To illustrate this point, consider that a modern business may require merely a few administrative personnel to oversee thousands of managed accounts corresponding to the businesses standard workforce. Further consider that employee preferences may vary such that a particular security policy that is optimal with respect to one employee may overly restrict another employee from using some applications which she would like to be permitted to use to access enterprise data resources. Accordingly, attempting to maintain an optimal security policy under a one-size-fits-all standard may present challenges to network administrators, as an optimal security policy may vary greatly between different employees and may even vary over time with respect to the same employee.

Delegating the authority to develop and/or manage a security policy, as applied to a managed account, to a standard user of that managed account, provides benefits over limiting this authority to a small group of administrative personnel. Standard users generally make work related decisions that are consistent with the best interests of the enterprise. Accordingly, so long as the standard user is cognizant of the purpose of the security policy and the risks associated with having the security policy set too loosely, decisions made by the standard user to change the security policy under certain circumstances will generally be consistent with decisions administrative personnel would have made under the same circumstances. For example, in many situations, change request tickets submitted by standard users would be quickly implemented with respect to the managed account once taken up by administrative personnel. In situations where the change request tickets are ultimately implemented by administrative personnel, it can be appreciated that it would have been more expedient to simply allow the standard user corresponding to the managed account to implement the same changes unilaterally, e.g. without having to wait for the administrative personnel to take up their change request ticket. Accordingly, if situations where change request tickets are ultimately denied and not implemented by administrative personnel are relatively rare, it may be prudent to at least partially delegate authority to develop and/or manage a security policy to standard users, e.g. users corresponding to managed accounts as opposed to administrative accounts.

For illustrative purposes, consider a scenario where a standard user that corresponds to a managed enterprise account wishes to perform some work-related task using an application that is typically used only for personal purposes and, therefore, is not included in a list of applications that are permitted to access enterprise data within the security policy. Further suppose that although the application being used by the standard user is not expressly permitted to access enterprise data resources, the enterprise's administrative personnel do not specifically object to this application accessing enterprise data resources. For example, the standard user may be generating a work-related presentation and may wish to use a media editing application (e.g. a photo and/or video editing application) that is personally owned by the standard user as opposed to the application being an enterprise owned application. Here, because the media editing application is not expressly permitted to access enterprise data resources, a policy enforcement service may apply a default rule that blocks un-listed applications from accessing enterprise data resources, e.g. unless an application is expressly listed as being permitted to access an enterprise resource it will be denied such access. According to the previously described conventional techniques for implementing changes to a security policy on a standard user's device, the standard user would be required to submit a change request ticket to enterprise administrative personnel and then wait some period of time before she can proceed to use her personally owned media editing application for the work-related task. In contrast to these conventional techniques which would hamper the standard user's productivity, techniques described herein enable the standard user to unilaterally override and/or customize enterprise application management settings to be deployed on her devices. Delegating security policy development and/or management authority to standard users may reduce costs associated with employee downtime during which particular applications are restricted from accessing enterprise data resources while simultaneously reducing the burden on administrative personnel of managing high volumes of change request tickets.

According to aspects of the present disclosure, a system is provided to enable a standard user corresponding to an enterprise managed account to at least partially override an enterprise security policy and/or one or more application management settings thereof. In some implementations, the system may obtain security policy data that includes application management settings indicating one or more applications that are permitted to access enterprise data resources from the managed account. For example, the application management settings may define permissions to be enforced for a particular application while the particular application is operating on a device on which the standard user is logged into the managed account. As a specific example, the device may have a policy enforcement service operating thereon that is configured to determine whether the standard user is logged into the managed account and, based thereon, deploy specific application management settings that correspond to the managed account, so long as the standard user remains logged in. In some implementations, an enterprise may deploy application management settings that are common to multiple standard user accounts. For example, an enterprise may deploy application management settings that are common to an enterprise engineering team, and other application management settings that are common to an enterprise accounting team.

In some implementations, the techniques disclosed herein also enable the system to receive a request to access a particular resource through a particular application that is operating from the managed account (e.g. operating on the device while the standard user is logged into the managed account). An exemplary such request may be generated by the particular application in an attempt to access enterprise data from local storage and/or an enterprise database that is accessible through an enterprise network. In another example, the exemplary request may correspond to the particular application attempting to communicate with an enterprise application. After having received the request, the system may analyze the request to identify the particular resource and determine whether it is tagged as an enterprise resource. For example, upon identifying the particular resource as a data file or network location, the system may determine one or more ownership properties associated therewith to determine whether it is tagged as being owned by the enterprise. In some implementations, the system may be configured to treat all data resources that are devoid of ownership properties as being personal data resources, e.g. any particular data resource will be determined to be an enterprise data resource only in the event that its ownership properties tag it as such. It can be appreciated that common operating systems such as, for example, numerous versions of MICROSOFT WINDOWS and MAC OS X include file ownership capabilities to enable permissions to be specifically controlled with respect to individual files and folders. Accordingly, it can be further appreciated that the determination that the particular resource is tagged as an enterprise data resource may include examining file/folder ownership properties that are built into common operating systems. In some implementations, upon identifying the particular resource associated with the request as an application, the system may analyze security policy data to determine whether the application is tagged as an enterprise application.

The system may further request analysis of the particular application a standard user is interested in using to access the identified enterprise resource. After having identified the particular application, the system may then analyze the application management settings that correspond to the managed account to determine whether or not the particular application is included in a set of permitted applications corresponding to the managed account. For example, the system may determine whether the particular application is permitted to access enterprise resources in general and/or whether the particular application is permitted to access the identified enterprise resources specifically. In instances where the particular application is included in the set of permitted applications, the system may permit the request by allowing the particular application to access the identified enterprise resource. However, where the particular application is not included in the set of permitted applications the system may respond to such requests in various ways. In some instances, the system may be configured to expose an application exemption manager based on the particular application not being included in the set of permitted applications. The application exemption manager may be configured to enable the standard user to generate an exemption instruction while logged into the managed account wherein the exemption instruction may cause the system to at least partially exempt the particular application from the security policy. Then, based on the exemption instruction generated by the standard user, the system may permit the particular application to access the identified enterprise resource while the standard user is logged into the managed account. In some instances, the system may further be configured to determine whether the particular application is included in a set of denied applications that are expressly restricted from accessing enterprise data resources in general and/or the identified enterprise resources specifically. For example, it can be appreciated that administrative personnel of the enterprise may elect to restrict a known peer-to-peer file sharing service from accessing enterprise data resources under any circumstances. In such instances, the system may be configured to expose the application exemption manager based on the particular application not being included in either the set of permitted applications or the set of denied applications. Accordingly, the system may be configured to enable the standard user to exempt the particular application from the security policy only if that particular application is not expressly addressed by administrative personnel in the security policy.

To further illustrate these concepts, suppose that the extent of a security policy is to expressly permit two applications (e.g. applications "A" and "B") to access an enterprise database while expressly restricting another application (e.g. application "C") from accessing the enterprise database. Further suppose that the standard user attempts to use application "D" to access the enterprise database. Under these circumstances the system may analyze the request to determine that the security policy's application management settings neither expressly permit nor expressly restrict application "D" from accessing the enterprise database. Accordingly, the system may respond to this request by exposing the application exemption manager to enable the standard user to exempt the particular application from the security policy so that the particular application can access the particular data resource while the standard user is logged into the managed account. Alternatively, suppose that the standard user attempts to use application "C" to access the enterprise database. Under these circumstances, the system may analyze the request corresponding to application "C" to determine that the security policy's application management settings do expressly restrict application "C" from accessing the enterprise database. Here, the system may refrain from exposing the application exemption manager and deny the request.

According to additional aspects of the present disclosure, a system is also provided for enabling a standard user to generate a custom security policy by modifying application management settings corresponding to a managed account. In some implementations, the system may obtain security policy data that indicates a set of approved applications that have been approved to access enterprise resources from a managed account. The set of approved applications may broadly include those applications which an administrative authority has determined to be acceptable for accessing enterprise data resources and/or communicating with enterprise applications. In general, the set of approved applications includes but is not limited to (e.g. it may be broader than) the set of permitted applications as indicated by application management settings to be permitted to access enterprise data resources from the managed account. Stated alternatively, the set of approved applications may include applications which have been approved, by the administrative authority, for accessing enterprise resources to perform work-related tasks but which the administrative authority does not chose to include in the set of permitted applications.

Upon receiving the security policy data, the system may determine a default security policy that includes application management settings that indicate the set of permitted applications. For example, the default security policy may indicate a set of permitted applications that are by default permitted to access enterprise data resources from the managed account. Then, the system may receive a request to access an enterprise resource from a particular application that is not by default permitted to access enterprise resources from the managed account despite being approved by the administrative authority to do so. Stated alternatively, the particular application is included in the set of approved applications but is not included in the set of permitted applications. It can be appreciated that in such a scenario the administrative authority would most likely grant a request from the standard user to modify the application management settings on her device to include the particular application within the set of permitted applications. In particular, the administrative authority would allow a custom security policy to be deployed for her managed account to permit the particular application to access the enterprise resource. Therefore, in some implementations, the system may expose a security policy customization interface to enable the standard user to generate a custom security policy having application management settings that include the particular application within the set of permitted applications.

For illustrative purposes, consider a scenario where a security policy includes application management settings that by default expressly permit various applications of a productivity suite (e.g. a word processing application, an email application, a spreadsheet application, etc.) to access enterprise resources such as, for example, data resources tagged as being owned by the enterprise. Further consider that the security policy indicates that a media editing application should be added to the set of permitted applications if requested by the standard user but should otherwise be excluded from the set of permitted applications. Under these circumstances, upon a standard user attempting to open a file that is tagged as an enterprise data resource, the system may determine that although the media editing application is not currently permitted to open this file, the enterprise's administrative authority has indicated that this media editing application is approved for enterprise use such that standard users can opt into including the media editing application within their particular set of permitted applications. Accordingly, the system may respond to the standard user attempting to open this file by exposing the security policy customization interface so that the standard user can add the media editing application to her particular set of permitted applications. Ultimately, once the application management settings are modified to permit the media editing application to access enterprise data resources, the standard user will then be permitted to open the file using the media editing application.

According to even more aspects of the present disclosure, a system is also provided for launching an application within a contained computing environment to provide that application with access to an enterprise resource based on that application not being permitted to access the enterprise resource from within a standard computing environment. For example, a standard user may attempt to access an enterprise data resource using an application that is neither expressly permitted nor expressly denied access to enterprise data resources. In such a scenario, rather than preventing the access altogether, the system may generate a contained computing environment to isolate the enterprise data resource from the standard computing environment. For example, the standard computing environment may simply be the computing environment generated by an operating system when the standard user logs into the managed account, whereas the contained computing environment may be specifically configured to isolate the application from the standard computing environment. Exemplary contained computing environments may include, but are not limited to, virtual machines and/or application containers that may be deployed on a client device of the standard user) and/or a remote enterprise computing device to isolate the enterprise data resource from the client device's standard computing environment. Then, the system may launch the application within the contained computing environment while managing disclosures of the enterprise data resource according to a security policy. In some implementations, the system may further expose the security policy customization interface to prompt a standard user to indicate characteristics of the application. For example, the user may indicate an application type for the application to enable the system to appropriately apply the security policy.

For illustrative purposes, consider again the scenario where the standard user attempts to use a personally owned media editing application to access enterprise data resources in order to generate the work-related presentation. For example, the user may attempt to open a data file that is tagged as being an enterprise data resource with the media editing application. Accordingly, the media editing application may generate a request to access this data file and, upon receiving the request, the system may analyze application management settings associated with the standard user's managed account to determine that the media editing application is not included in a set of permitted applications. Then, the system may prompt the standard user to indicate, via the security policy customization interface, what type of application the media editing application is so that the system can determine what portions of the security policy, if any, can be applied to the media editing application. For example, the user may indicate that the media editing application is similar to a word processing application that is included in the set of permitted applications. The system may then generate the contained computing environment and, ultimately, launch the media editing application within the contained computing environment to enable the media editing application to access the data file while concurrently isolating the data file from the standard computing environment and also managing disclosures of the data file according to the security policy for the contained computing environment, which may be modeled similarly to the enterprise security policy. In some implementations, due to the standard user indicating that the media editing application is similar to the system's word processing application, the system may treat the media editing application as it would treat the word processing application under similar security circumstances.

It should be appreciated that, although described in relation to a system, the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
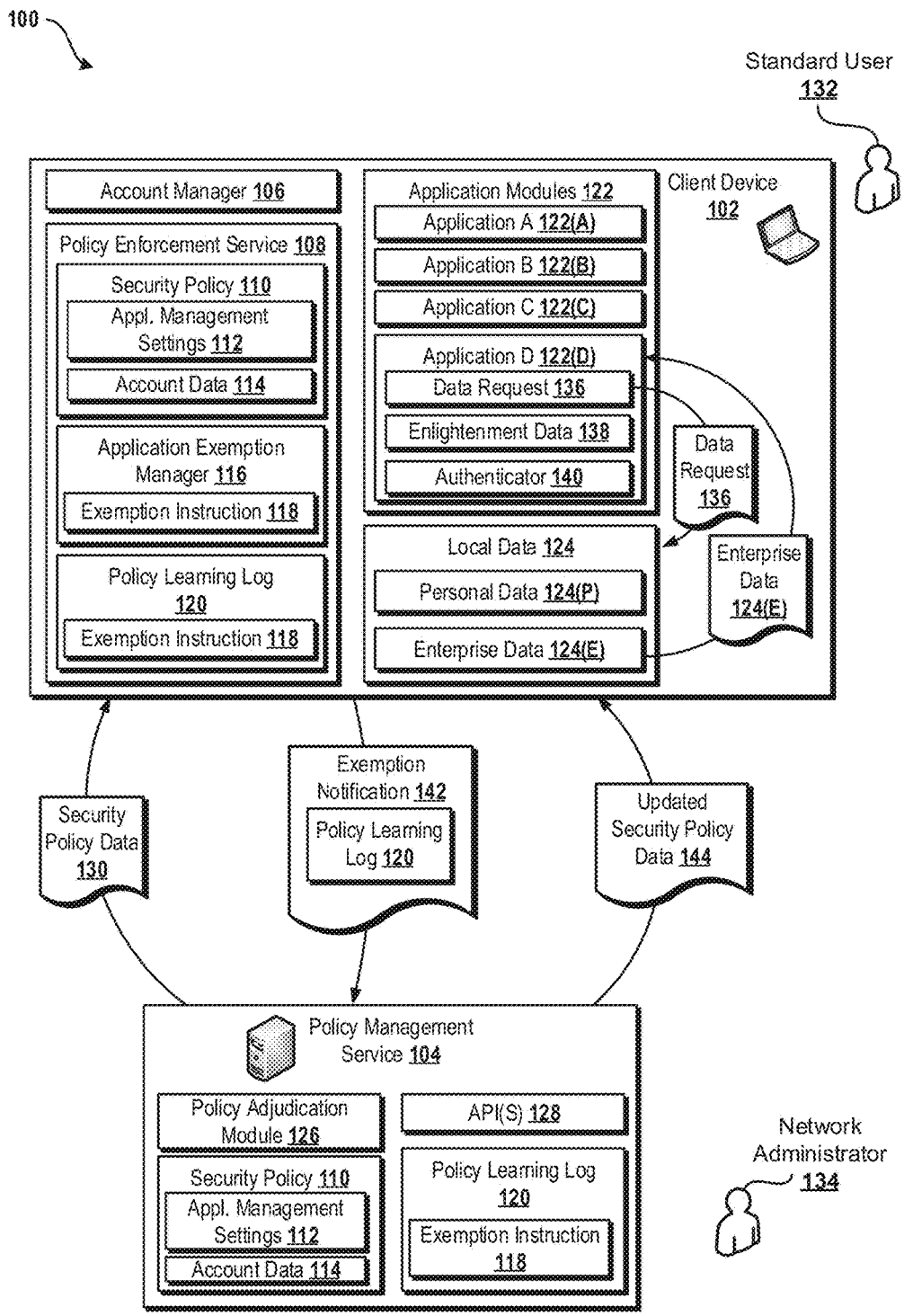
FIG. 1 illustrates an example data flow scenario of a system that enables a standard user to override application management settings of a security policy while the standard user is logged into a managed account.

The following Detailed Description describes techniques for delegating to managed account users a limited amount of authority to develop and/or manage a security policy for an enterprise network. Generally described, technologies disclosed herein enable a standard user of a managed account to override and/or customize application management settings and, ultimately, to enable an application to access enterprise resources despite the application management settings not listing the application as a permitted application. As described above, delegating some authority to develop and/or manage a security policy to a standard user of a managed account provides benefits over limiting this authority to a small group of enterprise administrative personnel. In particular, because employees generally make work related decisions that are consistent with the best interests of the enterprise, decisions made by a standard user to change a security policy will typically be consistent with decisions that administrative personnel would have made under similar circumstances. For example, in situations where change request tickets submitted to administrative personnel are ultimately implemented, it can be appreciated that it may be more expedient to have allowed the standard user corresponding to the managed account to implement the same changes unilaterally. Thus, it may be prudent to delegate authority to standard users to develop and/or manage a security policy corresponding to their managed accounts under these circumstances.

For illustrative purposes, consider a scenario where a standard user that corresponds to a managed enterprise account wishes to perform some work-related task using an application that is typically used only for personal purposes and, therefore, is not included in a list of applications that are permitted by the security policy to access enterprise resources. Further suppose that although the application is not expressly permitted to access enterprise resources, the enterprise's administrative personnel do not specifically object to this application accessing enterprise resources. For example, the standard user may be generating a work-related presentation and may wish to use a media editing application that is not an enterprise owned application. Here, because the media editing application is not expressly permitted to access enterprise data resources, a policy enforcement service may apply a default rule that blocks un-listed applications (i.e. applications that are neither listed in a set of permitted applications nor listed in a set of denied applications) from accessing enterprise data resources. Conventional techniques for provisioning access to the media editing application may require the standard user to submit a change request ticket to administrative personnel and then wait some period of time before she can proceed to use the media editing application for the work-related task. In contrast, techniques described herein enable the standard user to unilaterally override and/or customize application management settings being deployed on her client device to enable the media editing application to access the enterprise data much quicker. According to the techniques and concrete examples described herein, it can be appreciated that delegating security policy development and/or management authority to standard users may reduce costs associated with employee downtime while simultaneously reducing the burden on administrative personnel of managing high volumes of change request tickets.

Figure 3:
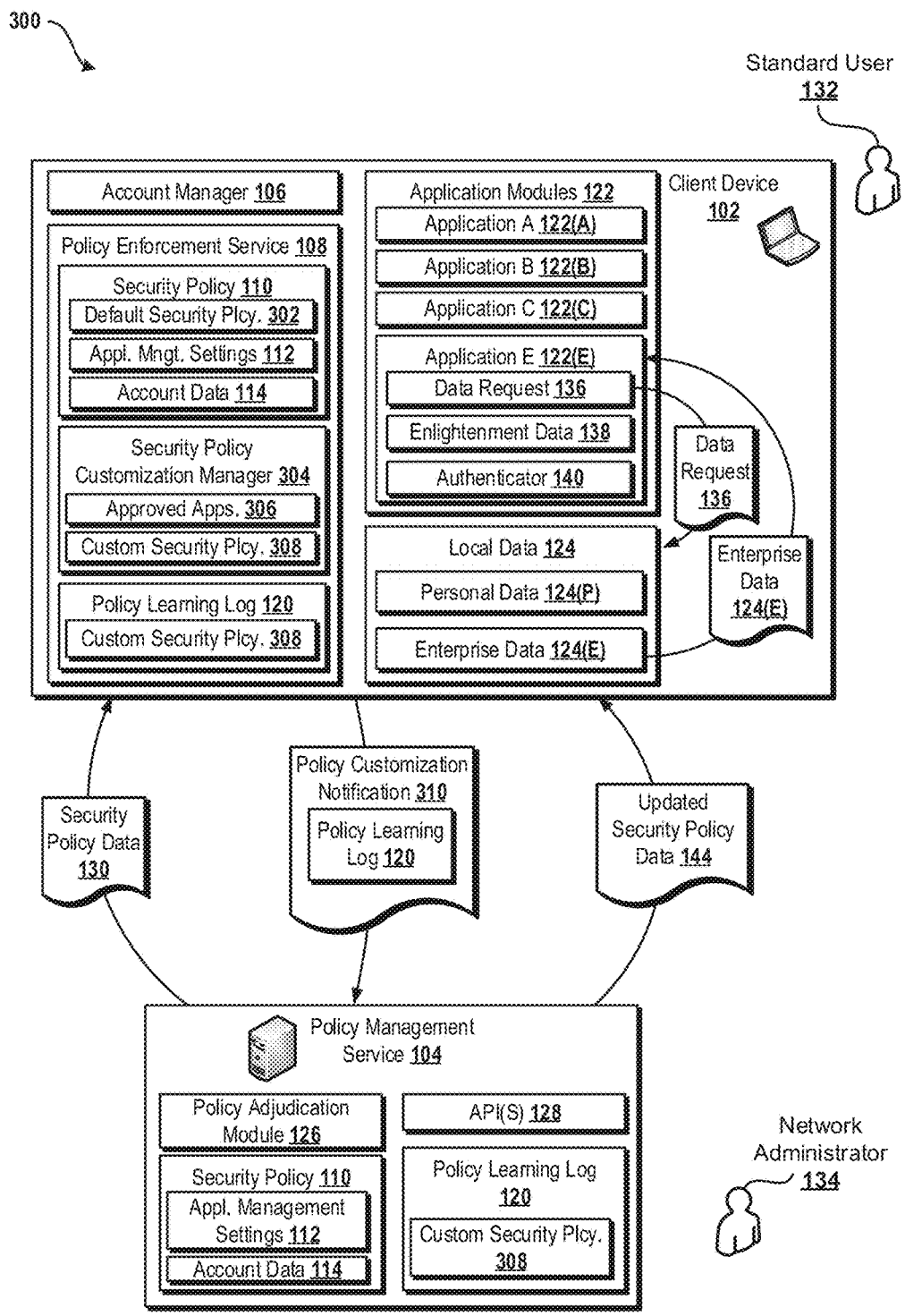
FIG. 3 illustrates an example data flow scenario of a system that enables a standard user to at least partially customize one or more application management settings of the security policy while the user is logged into a managed account.
Figure 5:
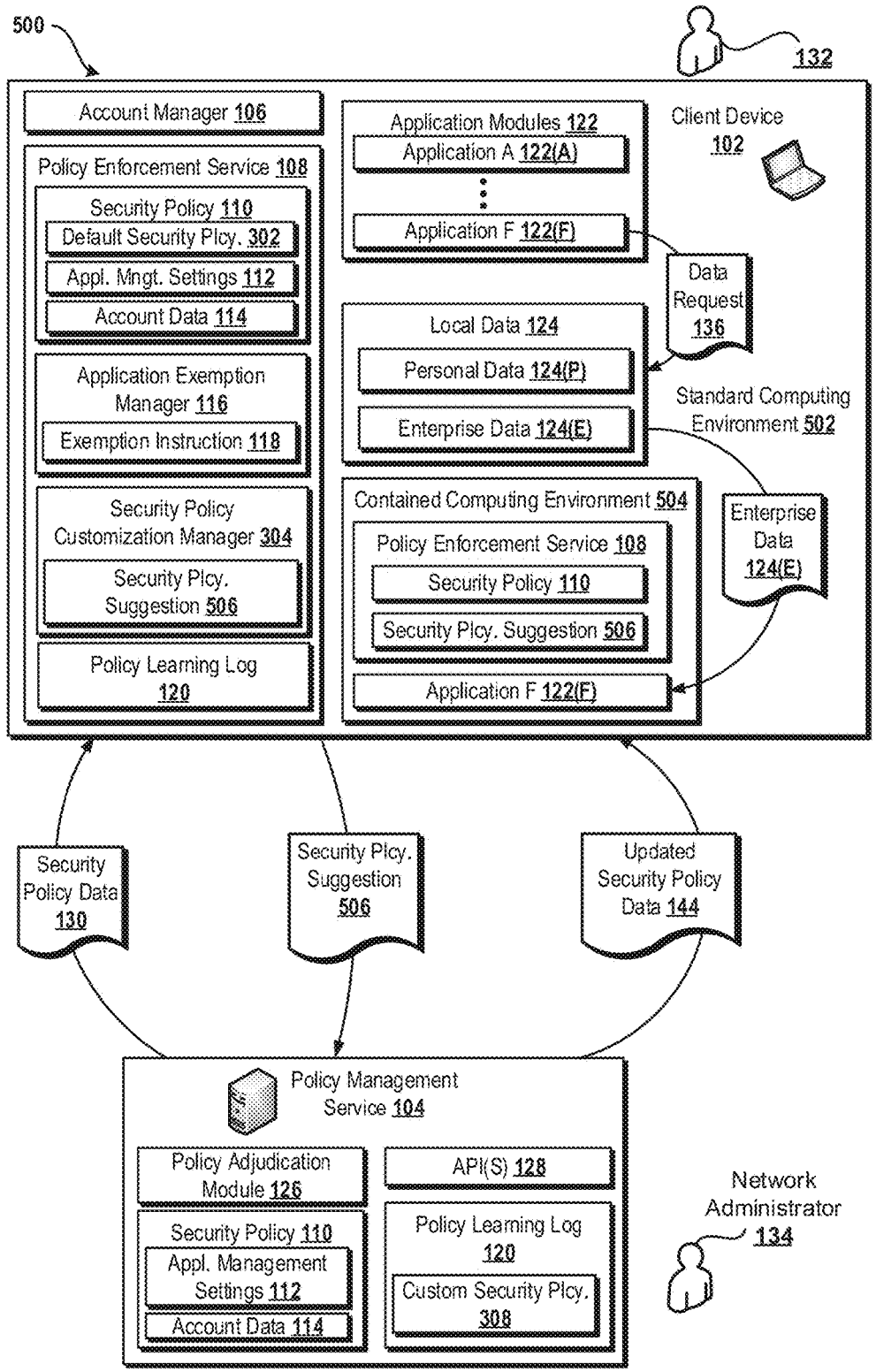
FIG. 5 illustrates an example data flow scenario of a system that enables an application that is not permitted to access an enterprise resource from within a standard computing environment to be launched in a contained computing environment to provide this application with access to the enterprise resource.

To illustrate aspects of the techniques disclosed herein, FIGS. 1, 3, and 5 illustrate various data flow scenarios of systems that enable a standard user of a managed account to enable an application to access enterprise resources despite the application management settings not currently including the application in a list of permitted applications. Similar to other illustrations described herein, it can be appreciated that operations and/or functionalities may be described according to a logical flow of data between various components. The order in which these operations and/or functionalities are described and/or illustrated herein is not intended to be construed as a limitation. Rather, any number of the operations and/or functionalities described with respect to any one of FIGS. 1, 3, and 5, may be combined in any order and/or in parallel in accordance with the present disclosure. Other processes and/or operations and/or functionalities described throughout this disclosure shall be interpreted accordingly.

Turning now to FIG. 1, an example data flow scenario is illustrated with respect to a system 100 that enables a standard user corresponding to a managed account to at least partially override one or more application management settings using an application exemption manager. As used herein, the term "standard user" refers to users who need to use one or more applications to access enterprise resources from a client device but whom are at least partially limited or restricted in their administrative authority with respect to accessing the enterprise resources as well as developing and/or managing the security policy. For example, a standard user may need to access an enterprise email database with an email client as well as one or more enterprise shared folders using various applications from a productivity suite. Furthermore, an enterprise may determine that the standard user can under no circumstances access enterprise resources with some particular application, e.g. a peer-to-peer file sharing application. As used herein, the term "managed account" refers to a user account that corresponds to a standard user within an enterprise. An exemplary managed account may be used to deploy a security policy based on the standard user logging into a managed account from a client device. In contrast to a standard user, as used herein, the term "administrative authority" refers to an entity (e.g. a person and/or third-party vendor of the enterprise) that has greater administrative rights than standard users and that can override and/or preempt certain actions of standard users with regard to developing and/or managing the security policy. An exemplary administrative authority may include one or more administrative personnel of the enterprise that have administrative credentials that allow them to log into administrative accounts through which security policy data may be modified to a greater extent than through a managed account corresponding to a standard user.

As illustrated, the system 100 may include a client device 102 that may generate various requests associated with accessing enterprise resources such as, for example, an enterprise application and/or data that is tagged as enterprise data. The system 100 may further include a policy management service 104 that is configured to send to the client device 102 at least some security policy data that includes application management settings.

In some embodiments, the client device 102 may include an account manager 106 that is configured to receive user credentials such as, for example, credentials that are specific to a standard user or credentials that are specific to a network administrator. Then, based on received user credentials, an operating system of the client device 102 may provide access to a standard computing environment associated with the received user credentials. For example, if the received user credentials correspond to the standard user then a computing environment with at least partially limited administrative rights may be created for use by the standard user. In contrast, if the received user credentials are the network administrator's then the operating system may create an alternate computing environment to provide relatively higher administrative permissions.

In some embodiments, the client device 102 may include a policy enforcement service 108 that is configured to enforce a security policy 110 that includes application management settings 112 and/or account data 114. Application management settings 112 may include, but are not limited to, a list of permitted applications that are to be permitted by the policy enforcement service 108 to access enterprise resources. For example, upon receiving a request from a particular application to receive data from an enterprise database or disclose data to an enterprise application, the policy enforcement service 108 may be configured to examine the application management settings and, ultimately, to determine whether the request should be permitted or blocked. As a specific example, the application management settings 112 may expressly permit two applications (e.g. applications "A" and "B") to access the enterprise data from the local storage of the client device 102. As an even more specific, but non-limiting example, applications "A" and "B" may belong to a productivity suite that enterprise employees are known to use for genuine business purposes. In some implementations, the application management settings 112 may further include a list of denied applications that are restricted from accessing enterprise resources. For example, the application management settings 112 may expressly restrict another application (e.g. application "C") from accessing the enterprise resources. As a more specific, but non-limiting example, application "C" may be a known peer-to-peer file sharing service that provides for little or no control over security measures taken downstream once data has been shared.

In some embodiments, the policy enforcement service 108 may further include an application exemption manager 116 that is configured to enable the standard user to exempt one or more application modules from the security policy 110 and/or application management settings 112 thereof. For example, under various circumstances such as, for example, those described herein, the application exemption manager 116 may cause a user interface to be displayed to the standard user that enables the standard user to generate an exemption instruction 118 instructing the policy enforcement service 108 to refrain from applying at least a portion of the security policy to a particular application. As will be described in more detail below, this exemption instruction may enable the standard user to use the application to access an enterprise data resource despite that application not being listed in a set of permitted applications.

In some embodiments, the client device 102 may further include a policy learning log 120 that is configured to receive, store, and/or transmit exemption instruction data 118. For example, upon an exemption instruction 118 being generated via the application exemption manager 116, the exemption instruction may be transmitted both to the policy enforcement service 108 to implement the instruction and also to the policy learning log 120 to document the instruction. As will be described in more detail below, the policy learning log 120 may be periodically transmitted to the policy management service 104.

In some embodiments, the client device 102 may further include one or more application modules 122, some of which may be expressly addressed by the application management settings 112 and some of which may be unaddressed by the application management settings 112. For purposes of the present discussion as it relates to FIG. 1, assume that the application management settings 112 include a set of permitted applications to expressly permit application A 122(A) and application B 122(B) to access one or more enterprise resources and include a set of denied applications to expressly restrict applications C 122(C) from accessing the one or more enterprise resources. Further assume that neither the set of permitted applications nor the set of denied applications include application D 122(D).

In some embodiments, the client device 102 may further include local data 124 (which may be stored a volatile or nonvolatile manner) that includes one or more of enterprise data 124(E) and/or personal data 124(P). The local data 124 may be stored in a volatile manner (e.g. a local cache) or in a nonvolatile manner (e.g. on a local hard drive).

In some embodiments, the policy management service 104 may include a policy adjudication module 126 that is configured to receive the policy learning log 120 to analyze the exemption instruction data 118 and, ultimately, to notify administrative personnel that certain security policy exemptions have been requested and/or have been granted. The policy management service 104 may further include one or more application programming interfaces 128 ("API 128") that expose an interface through which the policy management service 104 can send data to and/or receive data from the client device 102. Through the use of this data interface and other interfaces, the devices and services described herein can communicate and process data in such a manner as to enable the functionality and/or operations disclosed herein.

With respect to the example data flow scenario of FIG. 1, the policy management service 104 is shown to transmit security policy data 130 to the client device 102 and, more particularly, to the policy enforcement service 108 that is executable on the client device 102. As described above, exemplary security policy data 130 may define application management settings 112 for the plurality of application modules 122 with respect to enterprise resources in general and/or specific enterprise resources. For example, the application management settings 112 may permit application A 122(A) and application B 122(B) to access local data 124 that is tagged as enterprise data 124(E). The policy enforcement service 108 may be configured to analyze requests associated with individual ones of the application modules attempting to access various resources to determine whether those resources are tagged as belonging to the enterprise. For example, the policy enforcement service 108 may examine ownership properties that are built into an operating system of the client device 102. In some instances, the account manager 106 may be configured to communicate with the policy enforcement service 108 to enable the application management settings 112 to be varied across different user accounts. For example, although for purposes of the present discussion, the account data 114 may indicate that the standard user 132 is not permitted to access enterprise resources via application C 122(C), the account data 114 may also indicate that some other user (e.g. another standard user or a network administrator 134) is not restricted in their use of application C 122(C).

At some time during which the policy enforcement service 108 is deploying the security policy 110, a data request 136 may be generated in association with application D 122(D) being used to access an enterprise resource such as, for example, the enterprise data 124(E). The data request 136 may then be analyzed by the policy enforcement service 108 to identify the application and resources associated with the data request 136. More specifically, the policy enforcement service 108 may analyze the data request 136 to identify that the resource being sought is tagged as an enterprise resource and furthermore that the application seeking the enterprise resource is not included in a set of permitted applications defined in the application management settings 112. In some implementations, the application management settings 112 may further define a set of denied applications and the policy enforcement service 108 may further determine that the application seeking access to the enterprise resource is not included in the set of denied applications either. In accordance with the already outlined assumptions, the policy enforcement service 108 may analyze the data request 136 to determine that application D 122(D) is seeking access to enterprise resources, e.g. the enterprise data 124(E), and furthermore that application D 122(D) is not specifically addressed by the application management settings 112.

In some embodiments, the policy enforcement service 108 is further configured to analyze the application modules 122 to identify an enlightenment status indicating whether particular application modules 122 are specifically configured with functionality to enable communication with the policy enforcement service 108 for purposes of assisting with the deployment of the security policy 110. In particular, the policy enforcement service 108 may be specifically configured to analyze enlightenment data 138 corresponding to individual ones of the application modules 122. As used herein, the term "enlightenment" refers to whether an application is indicated as being capable of differentiating enterprise resources from other types of resources for the purposes of determining which resources to protect according to the security policy 110. For example, an enlightened application may be capable of differentiating enterprise data from personal data, and then protecting data that is determined to belong to the enterprise according to the security policy 110. In contrast, an unenlightened application may be unable to differentiate enterprise data from other data. Therefore, in some instances where an unenlightened application is permitted to access enterprise data according to the security policy 110, the unenlightened application may by default be required to encrypt any data it receives access to regardless of ownership properties corresponding to that data. For example, if an unenlightened application is added to the set of permitted applications and is subsequently used to access the personal data 124(P), an undesirable result may be that the unenlightened application is caused to encrypt the personal data 124(P) according to the security policy 110.

In some embodiments, the policy enforcement service 108 may further be configured to analyze the application modules 122 to identify an authenticator 140 indicating at least one of a source of the application modules 122 and/or a validity of the enlightenment data 138. For example, the policy enforcement service 108 may identify the authenticator 140 that corresponds to application D 122(D) in order to determine whether or not this application was sourced from a trusted publisher and/or distributor. As another example, the policy enforcement service 108 may identify the authenticator 140 to determine whether a source of the application (e.g. a publisher of the application) has specifically signed off as to the enlightenment data 138 to provide a heightened level of trust as to the enlightenment status of the application. As a more specific example, a well reputed and trusted publisher may sign the enlightenment data 138 public key infrastructure (PKI) certificate.

Based on an analysis of the data request 136, the policy enforcement service 108 may expose the application exemption manager 116 to enable the standard user 132 to generate the exemption instruction 118 while she is logged into her managed account. The exemption instruction 118 may cause the policy enforcement service 108 to permanently and/or temporarily exempt application D 122(D) from the security policy 110 and/or the application management settings 112 thereof. In particular, according to the present example, although application D 122(D) would typically have been prevented from accessing the enterprise data 124(E) based on the security policy 110 as defined by an administrative authority (e.g. the network administrator 134), the application exemption manager 116 is configured to enable the standard user 132 to at least partially override security policy 110 on a temporary and/or permanent basis. Stated alternatively, the standard user 132 is delegated a limited amount of authority to override the security policy 110. It can be appreciated, however, according to some implementations and under different circumstances that this limited amount of authority may be withheld from the standard user 132. To illustrate this point, recall that in accordance with the present assumptions application C 122(C) is included on a set of denied applications within the application management settings 112. Accordingly, in a scenario in which the standard user 132 attempts to use application C 122(C) to generate a data request seeking access to the enterprise data 124(E), the standard user 132 might not be delegated with the authority to permit this application to access the enterprise data 124(E). In some implementations, in instances in which the standard user 132 is not delegated within authority to exempt a particular application from the security policy 110, the policy enforcement service 108 may refrain from exposing the application exemption manager 116 to the standard user 132.

In some embodiments, the policy enforcement service 108 may be configured to refrain from permitting a particular application from accessing enterprise resources from various managed accounts based on the enlightenment status described above. For example, upon receiving the data request 136, the policy enforcement service 108 may analyze the enlightenment data 138 to determine whether application D 122(D) is an enlightened application. Then, based on a determination that application D 122(D) is an enlightened application, the policy enforcement service 108 may expose the application exemption manager as described above and, ultimately, permit the enlightened application to access the enterprise data 124(E) according to the data request 136. In contrast, based on an alternate determination that application D 122(D) is an unenlightened application, the policy enforcement service 108 may refrain from permitting the unenlightened application from accessing the enterprise data 124(E) according to the data request 136. In some embodiments, the policy enforcement service 108 may further be configured to identify whether a digital signature such as, for example, the authenticator 140 has been associated with the enlightenment data 138 to further validate the determined enlightenment status of the application module. Then, if a digital signature has been associated with the enlightenment status, the policy enforcement service 108 may further determine whether an origin of the digital signature is included within a set of publishers that are indicated as being trusted by the enterprise in the security policy 110. In some implementations, permitting any particular application to be permanently and/or temporarily exempted from the security policy 110 may be based on the origin of the digital signature. For example, the security policy 110 may include a list of several trusted publishers and permitting any particular application from being exempted from the security policy may be contingent on that particular application having been obtained from one of these several trusted publishers.

In some embodiments, the policy enforcement service 108 may be configured to cause an entry to be added to the policy learning log 120 wherein the entry documents include the exemption instruction 118. The entry may further indicate identifying information associated with one or more of the standard user 132 and/or the exempted application (e.g. application D 122(D) under the present circumstances), and/or the enterprise resource sought via the data request 136. In some embodiments, the policy enforcement service 108 may further be configured to store a copy of the enterprise data 124(E) within the policy learning log 120 for subsequent auditing of any actions performed by the standard user 132. For example, by allowing a standard user to exempt an application from the security policy 110, it can be appreciated that an enterprise may be accepting a certain amount of risk that enterprise data may be inadvertently and/or maliciously leaked. Accordingly, storing copies of any enterprise data that is sent to and/or transmitted by an exempted application may enable the network administrator 134 to concurrently and/or subsequently review actions performed by the standard user 132. In some embodiments, the application exemption manager may be configured to inform the standard user 132 that the policy enforcement service 108 may create a record of any activities performed by the user using the exempted application and/or any data transferred to or from the exempted application. Other exemplary types of information that may be relevant to be stored within the policy learning log 120 with respect to exemption instructions 118 include, but are not limited to, one or more various application properties and/or client device properties. Exemplary application properties include, but are not limited to, publisher information, version information, and/or hash information of an application line release. Exemplary client device properties include, but are not limited to, unique identifiers for the client device such as, for example, an international mobile equipment identifier (IMEI) number.

As illustrated, the policy enforcement service 108 may also provide an exemption notification 142 to the policy management service 104 to generally inform administrative personnel (e.g. the network administrator 134) that one or more exemption instructions 118 have been issued and/or to prompt policy adjudication by the administrative personnel. For example, the policy adjudication module 126 may be usable by the network administrator 134 to both view the exemption notification 142 and/or to access one or both of the security policy 110 and/or the policy learning log 120. The policy adjudication module 126 may further be usable by the network administrator 134 to generate updated security policy data 144 that defines particular application management settings 112 with respect to one or more applications which one or more standard users 132 have attempted to exempt from the security policy 110. Ultimately, the updated security policy data 144 may be sent to the policy enforcement service 108 to mitigate a future need of the standard user 132 to issue an exemption instruction 118 in order to permit the particular application to access the enterprise data resources from the managed account. Stated alternatively, the exemption notification 142 may prompt an enterprise decision maker (network administrator 134) to consider a resource that is not addressed by the security policy and/or application management settings 112 and decide whether to update the security policy 110 to include this particular application in a set of permitted applications, a set of denied applications, or a set of approved applications.

Figure 2:
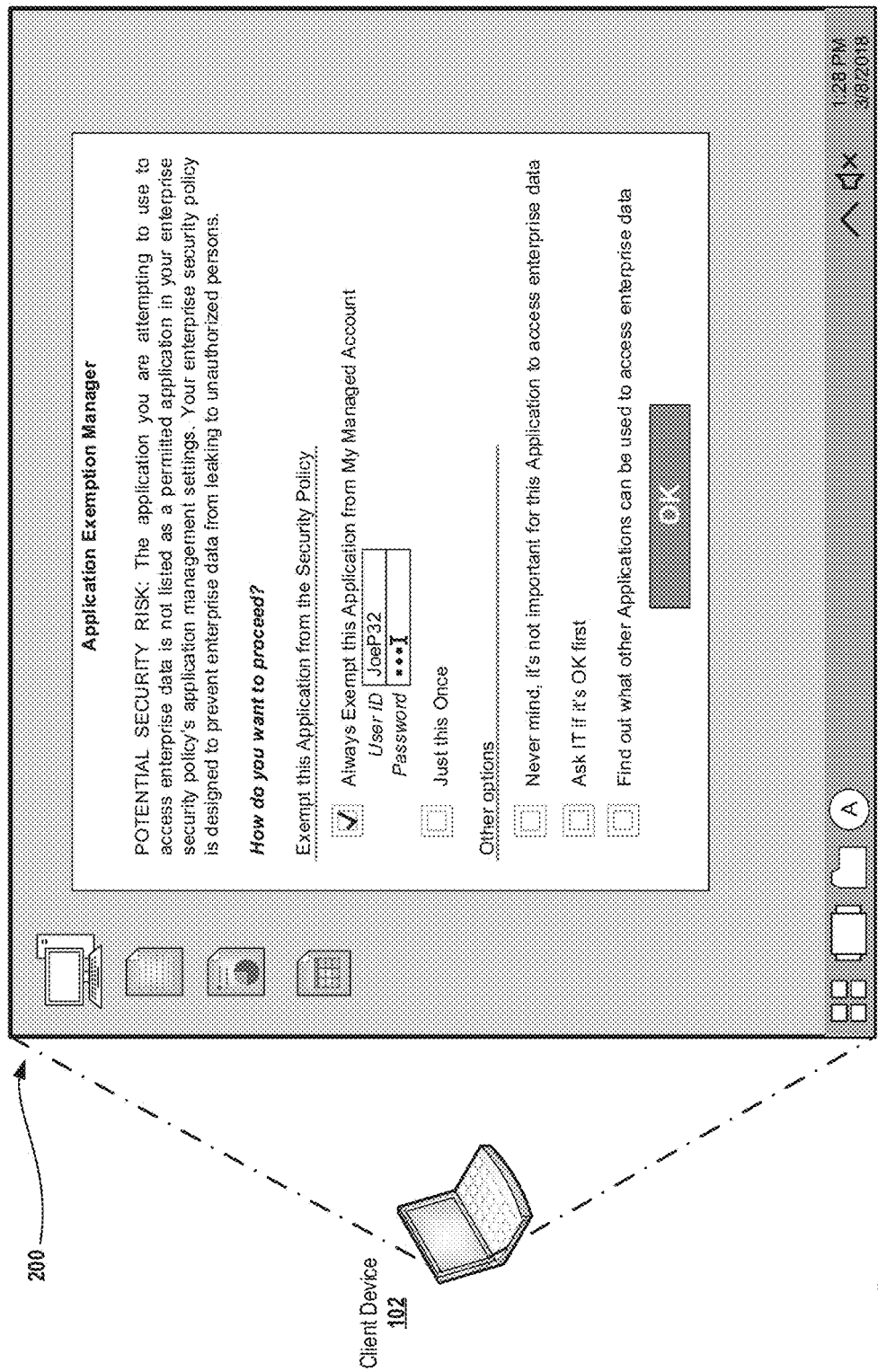
FIG. 2 illustrates various aspects of an application exemption manager user interface (UI) that can be displayed on a client device to enable a standard user to generate an exemption instruction.

Turning now to FIG. 2, illustrated here are various aspects of an application exemption manager user interface (UI) 200 that can be displayed on a client device 102 to enable the standard user 132 to generate the exemption instruction 118 from the application exemption manager as described herein. In the illustrated scenario, the application exemption manager UI 200 may communicate details of the security policy 110 as they relate to the particular application attempting to access enterprise resources. For example, as illustrated, the application exemption manager UI) 200 informs the standard user 132 that application D 122(D) is not listed within the application management settings 112 as an application that is permitted to access enterprise resources generally and/or the particular enterprise resource being sought in the data request 136. The application exemption manager (UI) 200 may further inquire as to how the standard user 132 would like to proceed while providing one or more options for doing so. For example, as illustrated the standard user 132 is provided with options to exempt the application from the security policy 110 as well as one or more other options. In some embodiments, the application exemption manager (UI) 200 may enable the standard user 132 to instruct the policy enforcement service 108 to permanently exempt application D 122(D) from the security policy 110 or, alternatively, to exempt this application on a temporary basis only (e.g. just once as illustrated and/or for a predefined limited period of time). In some embodiments, the policy enforcement service 108 may be configured to prompt policy adjudication with respect to a particular application corresponding to an exemption instruction based on that exemption instruction 118 attempting to permanently exempt that particular application from the security policy 110. Stated alternatively, in some embodiments, the policy enforcement service 108 may permit standard users to exempt applications from the security policy on a one-off basis without prompting policy adjudication whereas attempts to permanently exempt applications will prompt policy adjudication.

In some embodiments, the application exemption manager (UI) 200 may also enable the standard user 132 to select one or more other options such as, for example, exiting the application exemption manager without exempting the application, inquiring with administrative personnel whether it is permissible and/or advisable to exempt the application, or to find out if any other applications which are already included in a set of permitted applications are capable of accessing the sought-after enterprise resource.

In some embodiments, the application exemption manager (UI) 200 may prompt the standard user 132 to re-input corresponding user credentials in order to select one or more of the provided options. For example, in the illustrated scenario, the standard user 132 is being prompted to input her user credentials due to her having selected to permanently exempt application D 122(D) from the security policy 110.

In some embodiments, the policy enforcement service 108 may be configured to generate a contained computing environment as described in more detail below based on the standard user 132 generating the exemption instruction 118. Then, the exempted application may be launched within the contained computing environment while the contained computing environment manages disclosures of the enterprise resources being accessed in accordance with the security policy 110. For example, upon the standard user 132 generating the exemption instruction 118 to instruct the policy enforcement service 108 to exempt application D 122(D) from the security policy 110, the policy enforcement service 108 may respond by generating the contained computing environment and launching application D 122(D) therein while applying one or more aspects of the security policy 110 to the flows of data to and from the application D 122(D).

FIG. 3 illustrates an example data flow scenario of a system 300 that enables the standard user 132 to at least partially customize the security policy 110 while logged into her managed account. Similar to FIG. 1, the policy management service 104 is shown to transmit the security policy data 130 to the client device 102. Here, the security policy data 130 includes a default security policy 302 that defines default settings for the application management settings 112. In particular, the default security policy 302 defines a set of permitted applications that are by default permitted to access enterprise resources in general and/or one or more specified enterprise resources from a managed account that corresponds to the standard user 132. As used herein, the term "default security policy" refers to a version of the security policy 110 that is deployed on the client device 102 upon the managed account being provisioned by administrative personnel to the standard user 132. For example, the default security policy 302 may refer to that security policy that is deployed by the policy enforcement service 108 when the standard user 132 initially logs into her account. For purposes of the present discussion as it relates to FIG. 3, assume that the default security policy 302 indicates that application A 122(A) and application B 122(B) are by default to be expressly permitted to access one or more enterprise resources whereas application C 122(C) is by default to be expressly restricted from accessing one or more enterprise resources. Upon receiving the security policy data 130, the system may determine the default security policy 302 from the security policy data 130. Then, the policy enforcement service 108 may deploy this default security policy 302 until such time as the standard user 132 customizes this security policy according to the techniques described herein.

In some embodiments, the security policy data 130 may also indicate a set of approved applications that an administrative authority has approved for use by the standard user 132 to access enterprise resources. For example, the network administrator 134 may have considered and approved a broad group of applications for enterprise use but may elect to omit various ones of these approved applications from the default set of permitted applications. For example, the network administrator 134 may have considered a media editing application and determined that this application is suitable for use in accessing enterprise data resources. However, based on this application being unenlightened and also widely used to access personal data on the client devices 102, the network administrator 134 may purposefully omit this application from the set of permitted applications to mitigate the possibility of personal data being inadvertently encrypted and/or tagged as enterprise data. For purposes of the present discussion, assume that the security policy data 110 includes application E 122(E) in the set of approved applications.

At some time during which the policy enforcement service 108 is deploying the default security policy 302, a data request 136 may be generated in association with application E 122(E) being used to access an enterprise resources such as, for example, the enterprise data 124(E). As described above, the data request 136 may be analyzed to identify the application and resources associated therewith and, ultimately, to determine that application E 122(E) is not included in the set of permitted applications as defined by the default security policy 302. The policy enforcement service 108 may further determine that the particular application corresponding to the data request 136 is included in the set of approved applications 306. Accordingly, in addition to determining that application E 122(E) is not currently permitted to access the enterprise data 124(E), the system 300 may further determine that administrative personnel have preapproved application E 122(E) for being included within the set of permitted applications upon request from the standard user 132.

The policy enforcement service 108 may expose a security policy customization manager 304 to enable the standard user 132 to modify one or more of the application management settings 112 and, ultimately, to generate a custom security policy 308. For example, while the standard user 132 is logged into her managed account, she may modify the application management settings 112 to include application E 122(E) in the set of applications that are permitted to access the enterprise data 124(E). Therefore, based on administrative personnel having already considered application E 122(E) and added it to the set of approved applications 306, the standard user 132 is delegated an amount of authority that permits her to unilaterally add and/or remove application E 122(E) from the set of permitted applications. Upon the standard user 132 using the security policy customization manager 304 to generate the custom security policy 308, the policy enforcement service 108 may deploy this new policy with respect to the data request 136 to permit application E 122(E) to access the enterprise data 124(E).

In some embodiments, the policy enforcement service 108 is further configured to transmit a policy customization notification 310 to the policy management service 104 to inform an administrative authority such as, for example, the network administrator 134, of the custom security policy 308. The policy customization notification 310 may simply serve record-keeping purposes, e.g. the policy learning log 120 may simply be stored at the policy management service 104. In some embodiments, the network administrator 134 may access records associated with one or more custom security policies generated by standard users of the enterprise to periodically update the default security policy 302 and transmit the updated default security policy to the client device 102 via the updated security policy data 144.

In some embodiments, the policy customization notification 310 may prompt an administrative authority to perform policy adjudication, via the policy adjudication module 126, with respect to the custom security policy 308. For example, the network administrator 134 may be prompted to review and, ultimately, approve or deny the custom security policy 308. Once the custom security policy has been properly adjudicated, the outcome of the adjudication may be communicated via the updated security policy data 144 to instruct the policy enforcement service 108 whether or not to deploy the custom security policy 308. In some embodiments, the policy enforcement service 108 may be configured to refrain from deploying the custom security policy 308 until it has received updated security policy data 144 indicating that the custom security policy 308 has been adjudicated and approved by the network administrator 134. Accordingly, it can be appreciated that the policy enforcement service 108 may refrain from permitting application E 122(E) to access the enterprise data 124(E) until the updated security policy data 144 has been received.

As described above, the security policy data 130 may further include a set of denied applications that an administrative authority has expressly disapproved for use in accessing the enterprise resources from the managed account of the standard user 132. Accordingly, in some embodiments the security policy customization manager 304 may be configured to prevent the standard user 132 from modifying the application management settings 112 by adding expressly denied applications onto the set of permitted applications. For example, recall that the default security policy 302 expressly restricts application C 122(C) from accessing the enterprise data 124(E). In this scenario, it can be appreciated that the security policy customization manager 304 may be configured so as not to permit the standard user 132 to add application C 122(C) to the set of permitted applications.

In some embodiments, the account data 114 may indicate a level of trust corresponding to the managed account of the standard user 132 wherein the level of trust at least partially corresponds to an amount of authority delegated to the standard user 132. For example, the network administrator 134 may designate a level of trust to the standard user 132 that is high enough to enable the standard user 132 to unilaterally deploy the custom security policy 308, e.g. deploy modifications to the application management settings 112 without individualized review and approval by the network administrator 134. Alternatively, the network administrator 134 may designate a relatively lower level of trust to another standard user that is not high enough to enable this standard user to unilaterally deploy security policy customizations but that is high enough to permit this standard user to generate custom security policies that are subsequently transmitted to the policy adjudication module 126 for adjudication by the network administrator 134. Then, updated security policy data 144 may be transmitted back to the policy enforcement service 108 to indicate whether the submitted custom security policy requests have been approved. In the event of an approval, the policy enforcement service may then deploy the submitted security policy customizations. Alternatively, in the event of a denial, the policy enforcement service 108 may continue to deploy the default security policy 302.

In some embodiments, the network administrator 134 may designate an even lower level of trust to one or more standard users that is not high enough even for the security policy customization manager 304 to be exposed to these users. As a specific example, the account data 114 may indicate a level of trust corresponding to a plurality of entry-level employees that is too low for these employees to generate custom security policies. However, the account data 114 may further indicate a higher level of trust corresponding to a manager of these entry-level employees that permits the manager to generate custom security policies for herself and/or for the entry-level employees that report to her. In some embodiments, the manager may be assigned a level of trust that permits her to unilaterally deploy custom security policies for these entry-level employees and/or herself. In some embodiments, the manager may be assigned a level of trust that permits her to generate such custom security policies and submit them to the network administrator 134 for adjudication prior to these policies being deployed.

Figure 4A:
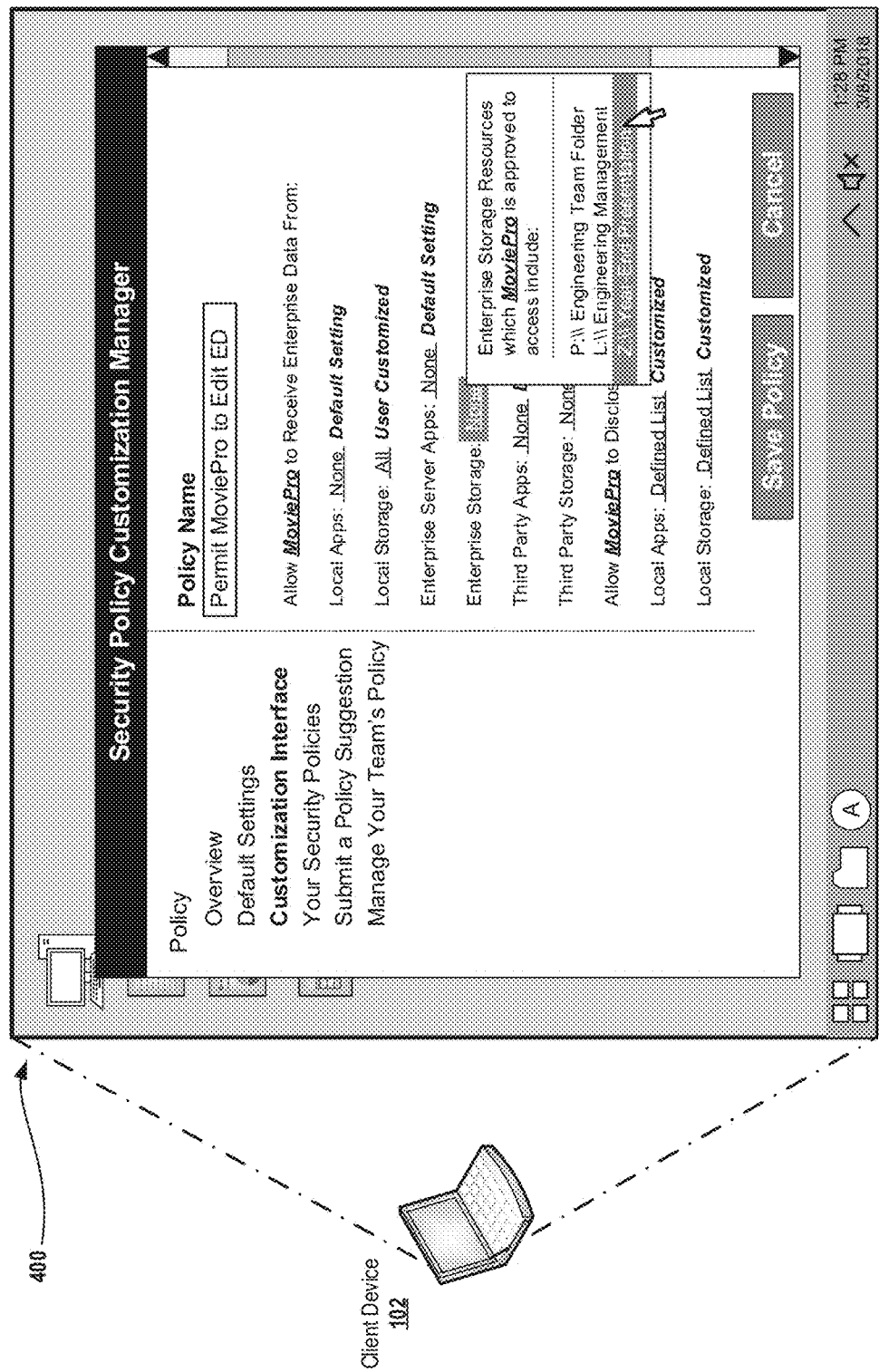
FIGS. 4A and 4B illustrate various aspects of a security policy customization manager UI that can be displayed on a client device to enable a standard user to generate a custom security policy.

Turning now to FIG. 4A, illustrated here are various aspects of a security policy customization manager (UI) 400 that can be displayed on the client device 102 to enable the standard user 132 to generate the custom security policy 308 as described herein. In the illustrated scenario, the security policy customization manager (UI) 400 may communicate details of the security policy 110 and, more particularly, the set of approved applications 306 as they relate to a particular application being approved for accessing enterprise resources. In the illustrated example, the security policy customization manager (UI) 400 is informing the standard user 132 that an application entitled "MoviePro" has been approved to access one or more enterprise storage resources. More specifically, the standard user 132 has selected the field of "Enterprise Storage" which in turn has caused an action menu to be displayed that lists three specific enterprise storage resources that the set of approved applications 306 indicates "MoviePro" as being approved to access. As illustrated, the standard user 132 has placed a cursor over an enterprise storage location entitled "Z:\\Year-End Presentation" to customize the application management settings 112 to permit the application entitled "MoviePro" to access this particular enterprise storage location. After entering the desired customizations, the standard user 132 may then save the policy as the custom security policy 308 by clicking the "Save Policy" button. In some embodiments, the security policy customization manager (UI) 400 may be configured to indicate a plurality of application management settings corresponding to particular resources (e.g. local apps, local storage, enterprise server apps, etc.) and indicate whether the settings corresponding to these particular resources remain according to default settings or whether they have been user customized. For example, in the illustrated scenario, the standard user has not modified the default settings with respect to whether the "MoviePro" application is permitted to receive enterprise data from local applications and enterprise server applications.

In some embodiments, the security policy customization manager (UI) 400 may also enable the standard user to assign a policy name to the customize security policy 308. In the illustrated example, the standard user 132 has named the custom security policy 308 "Permit MoviePro to Edit ED" to assist her in remembering how the custom security policy 308 differs from the default security policy 302. In some embodiments, the security policy customization manager (UI) 400 may enable the standard user to save multiple security policies and then subsequently view, further customize, and/or deploy these saved security policies. In the illustrated example, the standard user 132 may select the "Your Security Policies" tab on the left side of the UI 400 to access previously generated and saved security policies.

In some embodiments, the security policy customization manager (UI) 400 may enable the standard user 132 to assign an applicability interval to the custom security policy to limit how long the custom security policy 308 is deployed by the policy enforcement service 108. For example, the standard user 132 may designate the applicability interval as a predetermined time defined by minutes, hours, days, or any other relevant unit of time. Alternatively, the standard user 132 may designate the applicability interval according to some condition and/or event such as, for example, a power down event of the client device 102, a restart event of the client device 102, a log off event of the managed account, or any other relevant condition and/or event. In some implementations, the standard user 132 may designate the applicability interval as applying to the single data request 136 only such that once the data request 136 is fully processed at the client device 102 the policy enforcement service 108 will redeploy the default security policy 302 and/or some other custom security policy that was in place prior to the custom security policy 308 associated with the data request 136.

Figure 4B:
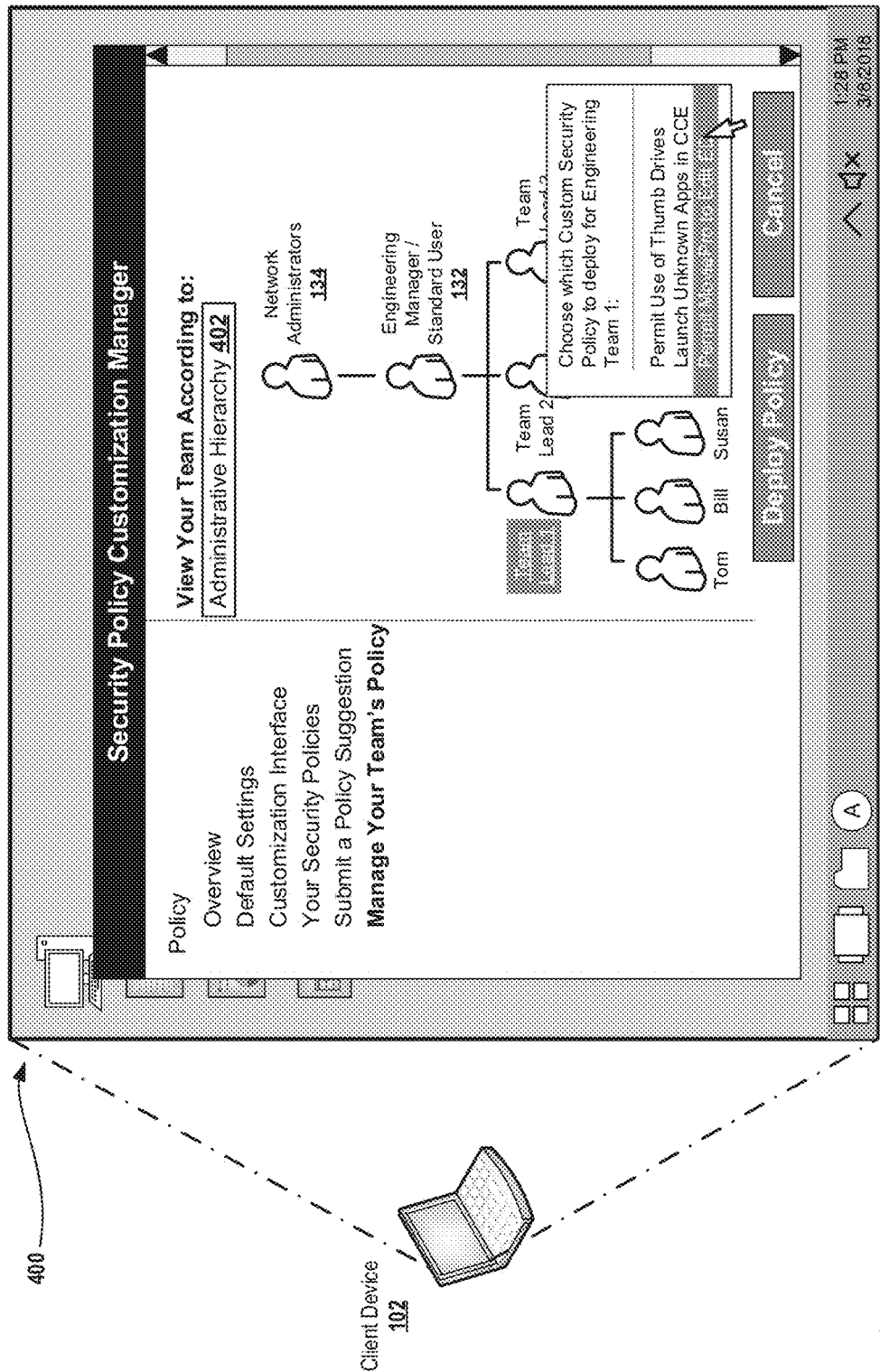

Turning now to FIG. 4B, in some embodiments, the security policy customization manager (UI) 400 may also enable the standard user 132 to manage security policies as they are deployed on one or more other managed accounts associated with other standard users. For example, an administrative authority may define an administrative hierarchy 402 with respect to an enterprise's numerous employees wherein the administrative hierarchy 402 identifies relationships between various managed accounts. As a specific example, an administrative hierarchy 402 is illustrated that includes network administrators at the top of the hierarchy such that these network administrators 134 are delegated with paramount authority with respect to managing the security policy 110. For example, these network administrators 134 may be tasked with generating the default security policy 302, managing the account data 114 (e.g. doling out user credentials, assigning trust levels for various standard user accounts, etc.), and/or defining the approved apps 306. Below the network administrators 134 on the administrative hierarchy 402 is an engineering manager (which for purposes of the discussion of FIG. 4B is assumed to be the standard user 132) in addition to several team leads below the standard user 132 and, ultimately, several lower-level employees below these team leads.

As illustrated, the security policy customization manager (UI) 400 is enabling the standard user 132 to choose from several custom security policies to be deployed for Engineering Team 1 (i.e. Team Lead 1, Tom, Bill, and Susan). Accordingly, it can be appreciated that in some embodiments the policy enforcement service 108 is configured to analyze the administrative hierarchy 402 to identify one or more other managed accounts that are associated with the managed account of the standard user 132. For example, the policy enforcement service 108 may analyze the administrative hierarchy 402 to determine that the managed accounts associated with Team Lead 1, Tom, Bill, and Susan, are each associated with the managed account of the standard user 132. Furthermore, the policy enforcement service 108 may determine whether the network administrators 134 have authorized the engineering manager/standard user 132 to modify settings for her account alone or whether she is authorized to modify settings for other managed accounts associated with hers according to the administration of hierarchy 402. As illustrated, the network administrators 134 have authorized the standard user to select at least three different custom security policies to be deployed for Engineering Team 1 and the standard user 132 is selecting the security policy entitled "Permit MoviePro to Edit ED." Upon selecting this custom security policy 308 and further clicking the "Deploy Policy" button the standard user 132 will cause updated security policy data to be transmitted to client devices associated with these managed accounts to cause the policy enforcement service on each of these devices to deploy this custom security policy.

FIG. 5 illustrates an example data flow scenario of a system 500 that enables an application that is not permitted to access an enterprise resource from within a standard computing environment 502 to be launched in a contained computing environment 504 to provide this application with access to the desired enterprise resource. As illustrated, the standard user 132 has attempted to access the enterprise data 124(E) from a standard computing environment 502 using application F 122(F) which has caused this application to generate the data request 136. Similar to FIGS. 1 and 3, here a policy enforcement service 108 that is operating on the client device 102 has obtained security policy data 110 from a policy management service 104. Furthermore, the security policy data 130 includes at least some application management settings 112 that indicate a set of permitted applications as described herein. In some implementations, the application management settings 112 may further indicate a set of denied applications as further described herein. For purposes of the discussion of FIG. 5, assume that application 122(F) is not included on either one of the set of permitted applications or the set of denied applications as defined by the application management settings 112. Upon the system 500 receiving the data request 136 corresponding to application F 122(F) attempting to access the enterprise data 124(E), the policy enforcement service 108 may identify one or more characteristics associated with the resources being sought in the request 136 to determine that these resources have been tagged enterprise resources. For example, the policy enforcement service may identify and analyze ownership property metadata associated with the enterprise data 124(E).

Based on the data request 136, the system 500 may further determine that the application associated with the request, i.e. application F 122(F), is not included in the set of permitted applications and, rather than preventing the requested access altogether, the system may generate the contained computing environment 504 and launch an instance of the application F 122(F) within the contained computing environment 504 to provide this application with access to the enterprise data 124(E) per the data request 136 while also isolating this data from the standard computing environment 502. As used herein, a "standard computing environment" refers generally to a basic computing environment generated by an operating system upon the standard user 132 logging into her managed account. In contrast, a "contained computing environment" refers to a computing environment that is specifically configured to isolate instances of applications running therein and/or data resources contained therein from a standard computing environment operating on the client device 102. Exemplary contained computing environments may include, but are not limited to, virtual machines and/or application containers that may be deployed on the client device and/or a remote computing device (e.g. an enterprise server) to isolate the enterprise data 124(E) from the client device's standard computing environment 502.

Upon generation of the contained computing environment 504, the system 500 may launch application F 122(F) therein to enable application F to access the enterprise data 124(E) in accordance with the data request 136 while being isolated from the standard computing environment 502 to mitigate risks associated with enterprise data leakage. In some embodiments, the system 500 may be configured to further launch an instance of the policy enforcement service 108 within the contained computing environment 504 to enable at least a portion of the security policy 110 to be deployed with respect to the instance of application F 122(F) operating in the contained computing environment 504.

In some embodiments, the system 500 may be configured to expose the security policy customization manager 304 to enable the standard user 132 to generate from her managed account's security policy (update) suggestion 506 corresponding to application F 122(F). For example, the user may be prompted to indicate one or more characteristics corresponding to this application such as, for example, whether this application is similar to one or more other applications for which application management settings 112 already exist. In some embodiments, the system 500 may be configured to treat receiving a security policy suggestion 506 as a precondition to launching the application within the contained computing environment 504. In particular, the standard user 132 may be required to generate the security policy suggestion 506 to inform the network administrator 134 how she believes that her security policy should be modified before the system 500 will permit her to have application F launched within the contained computing environment 504. In some embodiments, the system 500 may be configured to manage the contained computing environment 504 based at least in part on the security policy suggestion 506. For example, the security policy suggestion 506 may in some instances be transmitted to the instance of the policy enforcement service 108 that is operating within the contained computing environment 504.

As a specific example, suppose that application F is a personally owned media editing application that the standard user 132 wishes to temporarily use to generate some work-related presentation. Upon the user 132 attempting to access the enterprise data 124(E) with application F 122(F), the system 500 may inform the standard user 132 that this application is not permitted to access the requested data. The system 500 may further inform the standard user that she may override the security policy 110 by generating the security policy suggestion 506 and/or indicating to the system 500 the type of application that application F is (e.g. whether it is a word processing application, a movie editing application, a file-sharing application, etc.). Then, once the standard user 132 has indicated that she wishes to override the security policy 110 to provide application F with access to the sought-after enterprise data 124(E), the system 500 may launch the instance of application F within the contained computing environment 504 and manage disclosures from this application according to the security policy 110 and/or the security policy suggestion 506.

Figure 6:
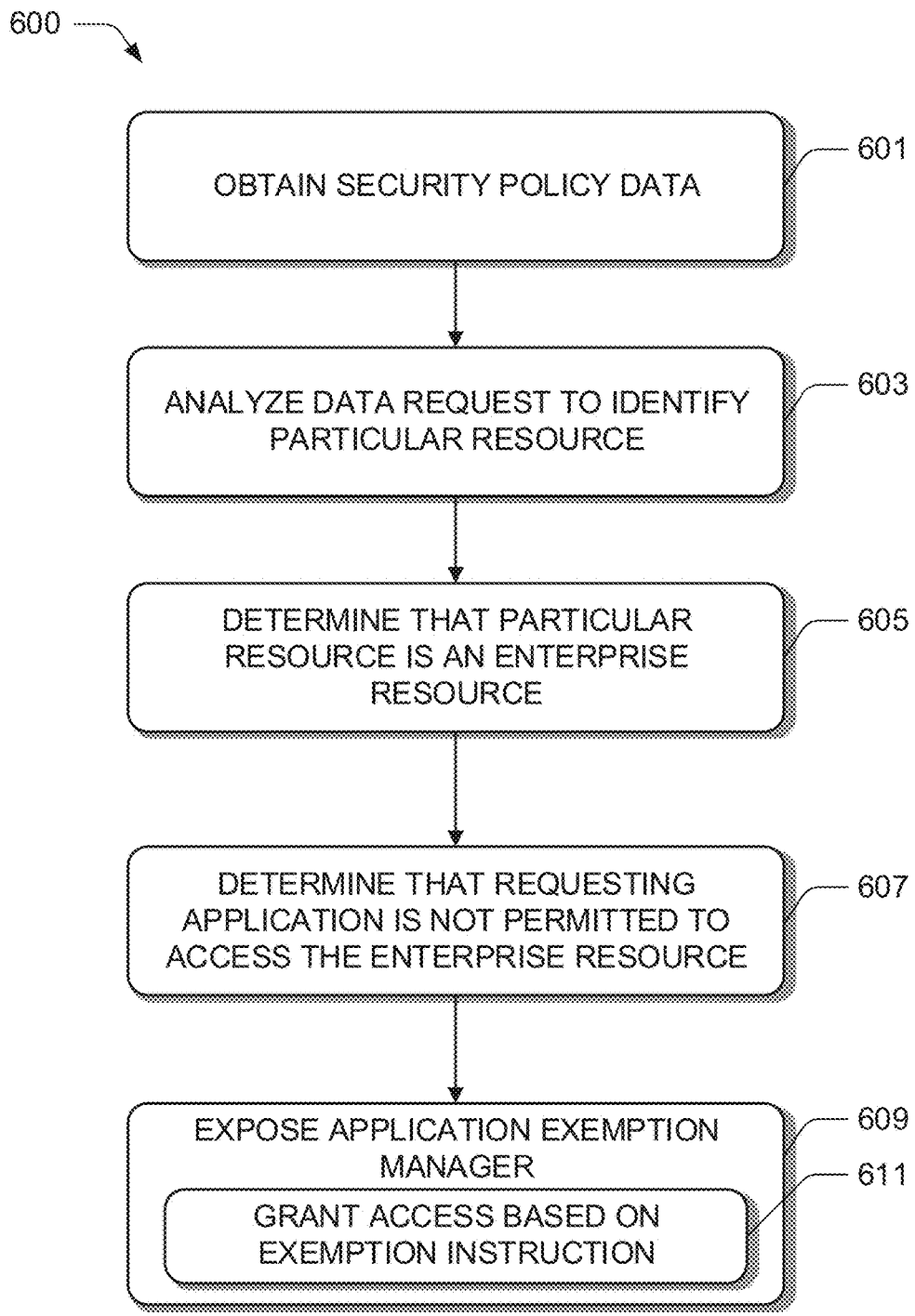
FIG. 6 is a flow diagram of an illustrative process to enable a standard user to override various aspects of a security policy from a managed account.

FIG. 6 is a flow diagram of an illustrative process 600 to enable a standard user to override various aspects of a security policy from a managed account. The process 600 is described with reference to FIGS. 1-5. The process 600 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

At block 601, a system may obtain security policy data that includes application management settings indicating at least some applications that are permitted to access one or more enterprise resources from a managed account associated with a standard user. In various instances, the application management settings may provide one or more applications with unfettered access to any and all enterprise resources. For example, the application management settings may indicate that a particular application is permitted to access any resource that is tagged as belonging to the enterprise rather than granting this particular application access to some enterprise resources but not others. In various instances, the application management settings may provide one or more applications with limited access to certain enterprise resources. For example, the application management settings may permit a particular application to access only a subset of resources that are tagged as belonging to the enterprise. According to some implementations, the security policy data 130 may be received from the policy management service 104 by the policy enforcement service 108 that is operating on a client device 102. Although illustrated as a laptop computing device in the FIGS., the client device 102 may be a server computer, a laptop computer, a desktop computer, or any other type of computing device. As described herein, exemplary forms of security policy data 130 include, but are not limited to, any type of mobile application management (MAM) permissions data and/or mobile device management (MDM) permissions data.

At block 603 the system may analyze a data request to identify a particular resource that is being requested. For example, in some instances the system may analyze the data request to identify a particular file and/or folder to which access is being requested. Furthermore, in some instances the system may analyze the request to identify an application that is requesting the particular resource. For example, with particular reference to FIG. 1, the system 100 may analyze the data request 136 to identify that application D 122(D) is seeking access to local data 124.

At block 605, the system may determine that the particular resource being requested is an enterprise resource. For example, the system may analyze the local data 124 to determine that it is tagged with metadata (e.g. using an operating system's ownership properties functionality) to indicate that this data is enterprise data 124(E).

At block 607, the system may determine that the application that is requesting to access the enterprise resource identified at block 605 is not indicated in the application management settings of the security policy data as being permitted to access the enterprise resource identified at block 605. For example, the system may analyze a set of permitted applications as defined by the application management settings 112 to determine that application D 122(D) is not permitted to access the enterprise data 124(E). In various implementations, the system may further determine that this application is also not expressly restricted from accessing the enterprise data 124(E). For example, the application management settings 112 may be devoid of any settings that specifically address application D 122(D).

At block 609, the system may expose an application exemption manager to enable the standard user 132 to at least partially override the application management settings 112 by creating an exemption instruction to exempt the requesting application from the security policy. Then, at block 611 the system may ultimately grant the data request by permitting the particular application to access the enterprise resource identified at block 605 despite the security policy data not expressly permitting this particular application such access. In some implementations, granting the data request may include generating a contained computing environment as discussed with relation to FIG. 5 and, ultimately, launching the particular application that issued the data request 136 within the contained computing environment to enable this application to access the sought-after enterprise data resource from the managed account while managing disclosures of the enterprise data resource according to the security policy.

Figure 7:
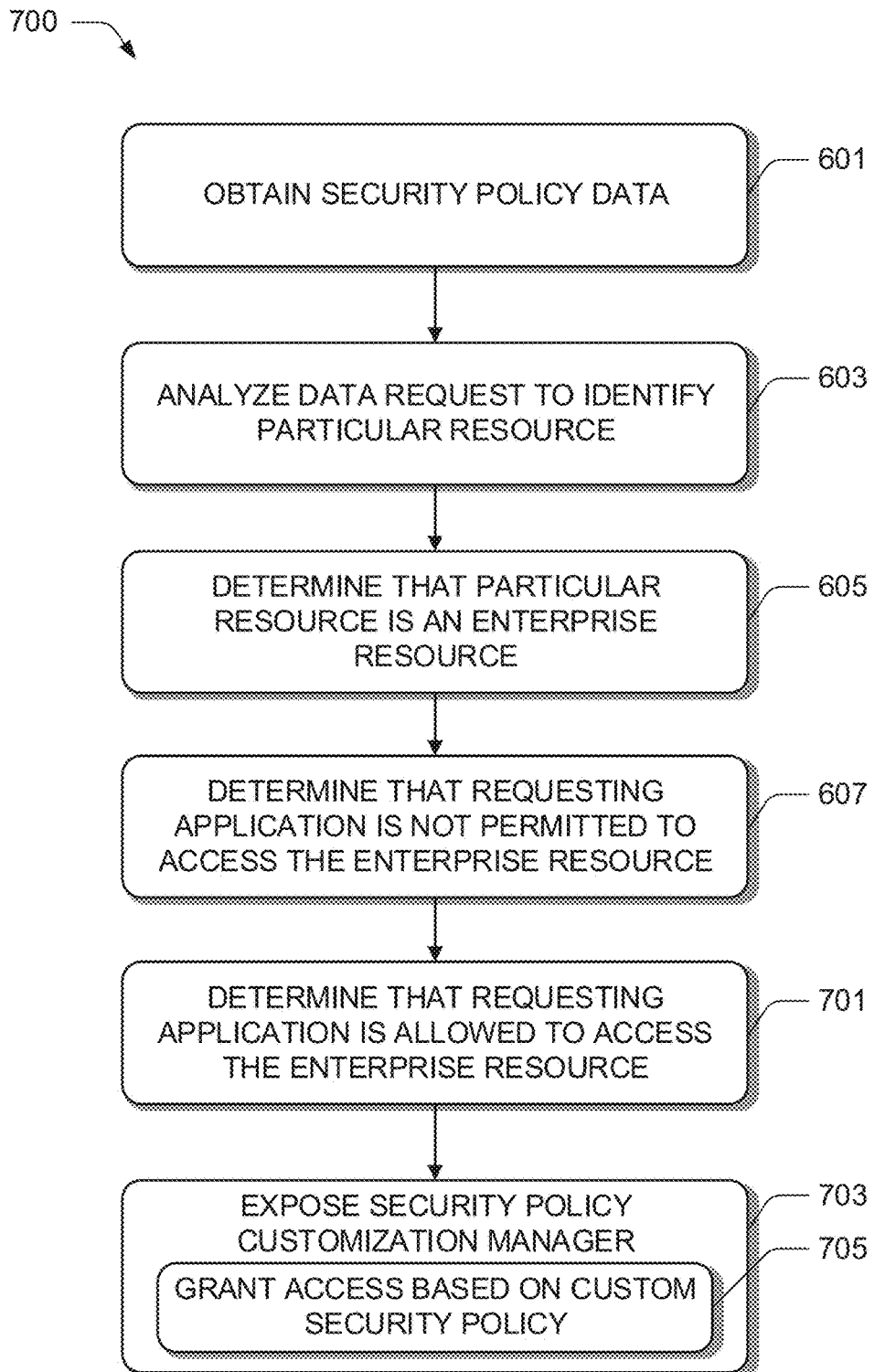
FIG. 7 is a flow diagram of an illustrative process to enable a standard user to modify one or more application management settings to generate a custom security policy from a managed account.

FIG. 7 is a flow diagram of an illustrative process 700 to enable a standard user 132 to modify one or more application management settings 112 to generate a custom security policy 308 from a managed account. As illustrated, process 700 includes blocks 601 through 607 as described with relation to FIG. 6. Accordingly, to avoid redundancy these blocks need not be discussed again.

At block 701, the system 700 may determine that the particular application that is not currently permitted to access the enterprise resource is, however, indicated by the security policy data obtained at block 601 as being allowed by the enterprise's administrative personnel to access the enterprise resource if desired by the standard user 132. For example, in addition to the set of permitted applications and/or the set of denied applications, the application management settings 112 may further include a set of allowed applications that the administrative authority is expressly approved to access enterprise resources from the managed account of the standard user 132.

At block 703, the system may expose a security policy customization interface to enable the standard user to generate the custom security policy 308. For example, the system may cause the client device 102 to display one or more of the UIs illustrated in FIGS. 4A-4B to thereby enable the standard user 132 to modify one or more of the application management settings 112. Then, at block 705 the system may ultimately grant the data request by permitting the particular application to access the enterprise resource identified at block 605 based on the custom security policy 308 that now does expressly permit this particular application to access the requested enterprise resource.

Figure 8:
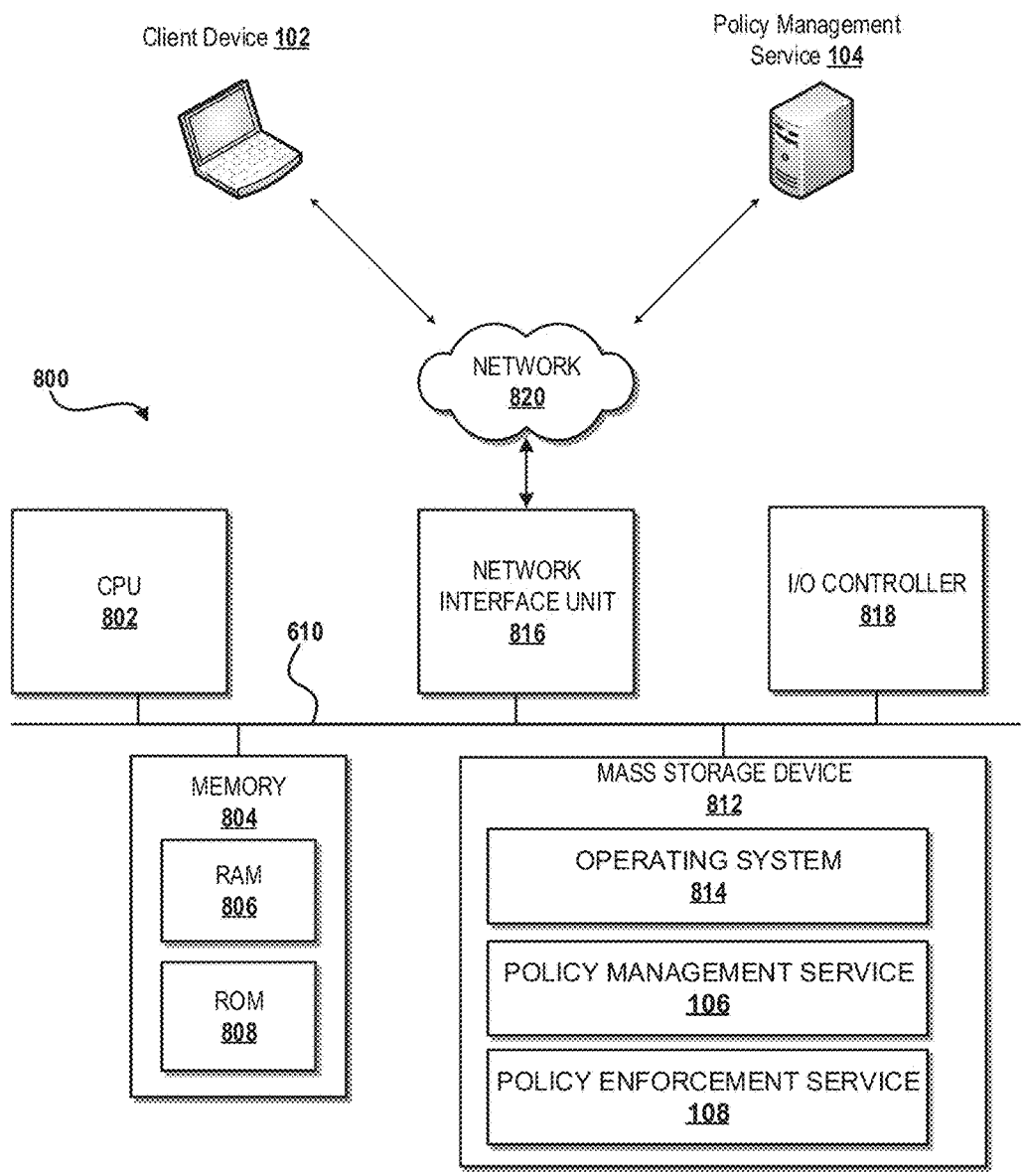
FIG. 8 shows additional details of an example computer architecture for a computer capable of executing the policy enforcement service and/or policy management service for any program components thereof as described herein.

The computer architecture 800 illustrated in FIG. 8 includes a central processing unit 802 ("CPU"), a system memory 804, including a random-access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing an operating system 814, other data, and one or more application programs. The mass storage device 812 may further include one or more of the policy management service 104 and/or policy enforcement service 108.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), BLU-RAY, or other optical storage, magnetic cassettes, magnetic tape, magnetic disk storage or other magnetic storage devices, or any other medium which can be used to store the desired information and which can be accessed by the computer architecture 800. For purposes the claims, the phrase "computer storage medium," "computer-readable storage medium" and variations thereof, does not include waves, signals, and/or other transitory and/or intangible communication media, per se.

According to various techniques, the computer architecture 800 may operate in a networked environment using logical connections to remote computers through a network 820 and/or another network (not shown). The computer architecture 800 may connect to the network 820 through a network interface unit 816 connected to the bus 810. It should be appreciated that the network interface unit 816 also may be utilized to connect to other types of networks and remote computer systems. The computer architecture 800 also may include an input/output controller 818 for receiving and processing input from a number of other devices, including a keyboard, mouse, or electronic stylus (not shown in FIG. 8). Similarly, the input/output controller 818 may provide output to a display screen, a printer, or other type of output device (also not shown in FIG. 8). It should also be appreciated that via a connection to the network 820 through a network interface unit 816, the computing architecture may enable the policy management service 104 and/or policy enforcement service 108 to communicate with the client device 102.

It should be appreciated that the software components described herein may, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all of the components shown in FIG. 8, may include other components that are not explicitly shown in FIG. 8, or may utilize an architecture completely different than that shown in FIG. 8.

EXAMPLE CLAUSES

The disclosure presented herein may be considered in view of the following clauses.

Example Clause A, a system for overriding application management settings from a managed account, the system comprising: at least one processor; and at least one memory in communication with the at least one processor, the at least one memory having computer-readable instructions stored thereupon that, when executed by the at least one processor, cause the at least one processor to: obtain a security policy that includes the application management settings to indicate a set of permitted applications that are permitted to access one or more enterprise resources from the managed account; receive a request to access a particular data resource through a particular application that is operating from the managed account; determine, based on the request, that the particular data resource is tagged as an enterprise data resource and that the particular application is not included in the set of permitted applications; expose an application exemption manager that is configured to enable a standard user to generate, from the managed account, an exemption instruction to at least partially exempt the particular application from the security policy; and permit, based on the exemption instruction, the particular application to access the particular data resource from the managed account.

Example Clause B, the system of Example Clause A, wherein the computer-readable instructions further cause the at least one processor to analyze the particular application to identify an enlightenment status that indicates that the particular application is configured to communicate with a policy enforcement service to at least partially enforce the security policy, wherein permitting the particular application to access the particular data resource from the managed account is further based on the enlightenment status.

Example Clause C, the system of any one of Example Clauses A through B, wherein the computer-readable instructions further cause the at least one processor to analyze the particular application to: identify a digital signature associated with the enlightenment status of the particular application; and determine that an origin of the digital signature corresponds to at least one trusted publisher of a predetermined set of trusted publishers, wherein permitting the particular application to access the particular data resource from the managed account is further based on the origin of the digital signature.

Example Clause D, the system of any one of Example Clauses A through C, wherein the application exemption manager is further configured to enable the standard user to assign a temporal applicability to the exemption instruction, wherein the temporal applicability indicates whether to apply the exemption instruction on a permanent basis or a temporary basis.

Example Clause E, the system of any one of Example Clauses A through D, wherein the computer-readable instructions further cause the at least one processor to cause an entry that corresponds to the exemption instruction to be added to a policy learning log that is accessible by a policy management service.

Example Clause F, the system of any one of Example Clauses A through E, wherein the computer-readable instructions further cause the at least one processor to prompt policy adjudication to generate particular application management settings corresponding to the particular application based on at least one of the exemption instruction or a temporal applicability assigned to the exemption instruction.

Example Clause G, the system of any one of Example Clauses A through F, wherein the computer-readable instructions further cause the at least one processor to: generate, based on the exemption instruction, a contained computing environment that is configured to manage disclosures of the one or more enterprise resources according to the security policy; and launch the particular application within the contained computing environment to permit the particular application to access the particular data resource from the managed account.

While Example Clauses A through G are described above with respect to a system, it is understood in the context of this document that the subject matter of Example Clauses A through G can also be implemented by a device, via a computer-implemented method, and/or via computer-readable storage media.

Example Clause H, a computer-implemented method, comprising: obtaining security policy data that indicates a set of approved applications that an administrative authority has approved to access enterprise resources from a managed account; determining, based on the security policy data, a default security policy that includes application management settings to indicate a set of permitted applications that are permitted to access the enterprise resources from the managed account; receiving a request associated with accessing the enterprise resources from the managed account through a particular application that is not included in the set of permitted applications; determining that the particular application is included in the set of approved applications; exposing, based at least in part on the request, a security policy customization interface to enable a standard user to generate, from the managed account, a custom security policy by modifying the application management settings to include the particular application within the set of permitted applications; and permitting, based on the custom security policy, the particular application to access the enterprise resources from the managed account.

Example Clause I, the computer-implemented method of Example Clause H, further comprising: transmitting the custom security policy to a policy management service to prompt the administrative authority to perform policy adjudication with respect to the custom security policy; and receiving updated security policy data that is based at least in part on the policy adjudication.

Example Clause J, the computer-implemented method of any one of Example Clauses H through I, wherein permitting the particular application to access the enterprise resources from the managed account is further based upon the updated security policy data.

Example Clause K, the computer-implemented method of any one of Example Clauses H through J, the computer-implemented method of claim 8, further comprising: analyzing an administrative hierarchy to identify one or more other managed accounts that are associated with the managed account; and permitting, based on the custom security policy, the particular application to access the enterprise resources from the one or more other managed accounts.

Example Clause L, the computer-implemented method of any one of Example Clauses H through K, wherein the security policy data further indicates a set of denied applications that the administrative authority has disapproved for accessing the enterprise resources from the managed account, and wherein the security policy customization interface is configured to prevent the standard user from modifying the application management settings to include individual applications from the set of denied applications.

Example Clause M, the computer-implemented method of any one of Example Clauses H through L, further comprising: determining a trust level corresponding to the managed account; and enabling the standard user to unilaterally deploy the custom security policy based on a trust level meeting or exceeding a threshold trust level.

Example Clause N, the computer-implemented method of any one of Example Clauses H through M, wherein the security policy customization interface is further configured to enable the standard user to indicate a predefined applicability interval associated with the custom security policy, and wherein permitting the particular application to access the enterprise resources from the managed account is limited to the predefined applicability interval.

Example Clause O, the computer-implemented method of any one of Example Clauses H through N, further comprising authenticating the standard user based on user credentials that correspond to the managed account, and wherein enabling the standard user to generate the custom security policy is further based on the authenticating the standard user.

While Example Clauses H through O are described above with respect to a method, it is understood in the context of this document that the subject matter of Example Clauses H through O can also be implemented by a device, by a system, and/or via computer-readable storage media.

Example Clause P, a computer-readable storage medium having computer-executable instructions stored thereupon which, when executed by one or more processors of a computing device, cause the one or more processors of the computing device to: obtain a security policy including at least one application management settings to indicate a set of permitted applications that are permitted to access enterprise resources from a managed account while operating in a standard computing environment; receive a request to access a particular data resource through a particular application that is not included in the set of permitted applications; identify one or more characteristics of the particular data resource to determine that the particular data resource is an enterprise data resource; generate a contained computing environment that is configured to isolate the enterprise data resource from the standard computing environment and to manage disclosures of the enterprise data resource according to the security policy; and launch the particular application within the contained computing environment to enable the particular application to access the enterprise data resource from the managed account while operating in the contained computing environment.

Example Clause Q, the computer-readable storage medium of Example Clause P, wherein the instructions further cause the one or more processors of the computing device to: expose a security policy customization interface to enable a standard user to generate, from the managed account, a security policy update suggestion corresponding to the particular application; and manage the contained computing environment based at least in part on the security policy update suggestion.

Example Clause R, the computer-readable storage medium of any one of Example Clause P through Q, wherein the instructions further cause the one or more processors of the computing device to transmit the security policy update suggestion to a policy management service to prompt policy adjudication with respect to the security policy update suggestion, wherein launching the particular application within the contained computing environment is conditional upon the policy management service receiving the security policy update suggestion.

Example Clause S, the computer-readable storage medium of any one of Example Clauses P through R, wherein the instructions further cause the one or more processors of the computing device to expose a security policy customization interface to prompt a standard user to indicate, from the managed account, one or more characteristics corresponding to the particular application.

Example Clause T, the computer-readable storage medium of any one of Example Clauses P through S, wherein the contained computing environment includes a policy enforcement service operating within at least one of an application container or a virtual machine, the policy enforcement service being configured to manage the contained computing environment based at least in part on the security policy.

While Example Clauses P and T are described above with respect to a system, it is understood in the context of this document that the subject matter of Example Clauses S and T can also be implemented by a device, via a computer-implemented method, and/or via computer-readable storage media.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:
1. A system comprising:
   at least one processor; and
   at least one memory in communication with the at least one processor, the at least one memory having computer-readable instructions stored thereupon that, when executed by the at least one processor, cause the at least one processor to:
   obtain a security policy that includes application management settings that are generated from at least one administrative authority account that corresponds to a greater level of administrative rights than a managed account, wherein the application management settings indicate a set of permitted applications that are permitted to access one or more enterprise resources from the managed account;
   receive a request to access a particular data resource through a particular application that is operating from the managed account;
   determine, based on the request, that the particular data resource is tagged as an enterprise data resource and that the particular application is not included in the set of permitted applications;
   expose an application exemption manager that is configured to enable a standard user to generate, from the managed account, an exemption instruction to at least partially exempt the particular application from the security policy, wherein the exemption instruc- tion is generated from the managed account independently from the at least one administrative authority account; and permit, based on the exemption instruction, the particular application to access the particular data resource from the managed account.

2. The system of claim 1, wherein the computer-readable instructions further cause the at least one processor to analyze the particular application to identify an enlightenment status that indicates that the particular application is configured to communicate with a policy enforcement service to at least partially enforce the security policy, wherein permitting the particular application to access the particular data resource from the managed account is further based on the enlightenment status.

3. The system of claim 2, wherein the computer-readable instructions further cause the at least one processor to analyze the particular application to:

identify a digital signature associated with the enlightenment status of the particular application; and
determine that an origin of the digital signature corresponds to at least one trusted publisher of a predetermined set of trusted publishers, wherein permitting the particular application to access the particular data resource from the managed account is further based on the origin of the digital signature.

4. The system of claim 1, wherein the application exemption manager is further configured to enable the standard user to assign a temporal applicability to the exemption instruction, wherein the temporal applicability indicates whether to apply the exemption instruction on a permanent basis or a temporary basis.

5. The system of claim 1, wherein the computer-readable instructions further cause the at least one processor to cause an entry that corresponds to the exemption instruction to be added to a policy learning log that is accessible by a policy management service.

6. The system of claim 1, wherein the computer-readable instructions further cause the at least one processor to prompt policy adjudication to generate particular application management settings corresponding to the particular application based on at least one of the exemption instruction or a temporal applicability assigned to the exemption instruction.

7. The system of claim 1, wherein the computer-readable instructions further cause the at least one processor to:

generate, based on the exemption instruction, a contained computing environment that is configured to manage disclosures of the one or more enterprise resources according to the security policy; and
launch the particular application within the contained computing environment to permit the particular application to access the particular data resource from the managed account.

8. A computer-implemented method, comprising:

obtaining, from an administrative authority account, security policy data that indicates a set of approved applications that an administrative authority has approved for use to access enterprise resources from a managed account that corresponds to a standard user, wherein the administrative authority account is associated with a greater level of administrative rights than the managed account that corresponds to the standard user;
determining, based on the security policy data, a default security policy that includes application management settings to indicate a set of permitted applications that are permitted to access the enterprise resources from the managed account;
receiving a request associated with accessing the enterprise resources from the managed account through a particular application that is not included in the set of permitted applications;
determining that the particular application is included in the set of approved applications;
exposing, based at least in part on the request, a security policy customization interface to enable the standard user to generate, from the managed account, a custom security policy by modifying the application management settings to include the particular application within the set of permitted applications, wherein the custom security policy is generated from the managed account without prompting input from the administrative authority account; and
permitting, based on the custom security policy, the particular application to access the enterprise resources from the managed account.

9. The computer-implemented method of claim 8, further comprising:

transmitting the custom security policy to a policy management service to prompt the administrative authority to perform policy adjudication with respect to the custom security policy; and
receiving updated security policy data that is based at least in part on the policy adjudication.

10. The computer-implemented method of claim 8, further comprising:

analyzing an administrative hierarchy to identify one or more other managed accounts that are associated with the managed account; and
permitting, based on the custom security policy, the particular application to access the enterprise resources from the one or more other managed accounts.

11. The computer-implemented method of claim 8, wherein the security policy data further indicates a set of denied applications that the administrative authority has disapproved for accessing the enterprise resources from the managed account, and wherein the security policy customization interface is configured to prevent the standard user from modifying the application management settings to include individual applications from the set of denied applications.

12. The computer-implemented method of claim 9, further comprising:

determining a trust level corresponding to the managed account; and
enabling the standard user to unilaterally deploy the custom security policy based on a trust level meeting or exceeding a threshold trust level.

13. The computer-implemented method of claim 8, wherein the security policy customization interface is further configured to enable the standard user to indicate a predefined applicability interval associated with the custom security policy, and wherein permitting the particular application to access the enterprise resources from the managed account is limited to the predefined applicability interval.

14. The computer-implemented method of claim 8, further comprising authenticating the standard user based on user credentials that correspond to the managed account, and wherein enabling the standard user to generate the custom security policy is further based on the authenticating the standard user.

15. A computer-implemented method, comprising:

obtaining a security policy that includes application management settings that define a set of permitted applications that have been indicated as being permitted to access one or more enterprise resources from a managed account that corresponds to a standard user, wherein the application management settings are generated through an administrative authority account that corresponds to a greater level of administrative rights than the managed account that corresponds to the standard user;

receiving a request to access a particular data resource through a particular application that is operating from the managed account that corresponds to the standard user;

determining that the particular data resource is tagged as an enterprise data resource and that the particular application is not included in the set of permitted applications that have been indicated as being permitted to access the one or more enterprise resources from the managed account that corresponds to the standard user;

exposing an application exemption manager that is configured to enable the standard user to generate, from the managed account without prompting input from the administrative authority account, an exemption instruction to at least partially exempt the particular application from the security policy; and permitting, based on the exemption instruction, the particular application to access the particular data resource from the managed account.

16. The computer-implemented method of claim 15, wherein the application exemption manager is further configured to enable the standard user to assign a temporal applicability to the exemption instruction.

17. The computer-implemented method of claim 16, wherein the temporal applicability indicates whether to apply the exemption instruction on a permanent basis or a temporary basis.

18. The computer-implemented method of claim 15, wherein permitting the particular application to access the particular data resource from the managed account based on the exemption instruction includes:

generating, based on the exemption instruction, a contained computing environment that is configured to manage disclosures of the one or more enterprise resources according to the security policy; and launching the particular application within the contained computing environment to permit the particular application to access the particular data resource from the managed account.

19. The computer-implemented method of claim 15, further comprising causing an entry that corresponds to the exemption instruction to be added to a policy learning log that is accessible by a policy management service.

* * * * *